United States Patent
Kobayashi et al.

(10) Patent No.: US 7,599,318 B2
(45) Date of Patent: Oct. 6, 2009

(54) TECHNIQUE FOR ENABLING COMMUNICATION BETWEEN A COMMUNICATION DEVICE THAT PERFORMS AN INTERMITTENT RECEPTION AND A COMMUNICATION DEVICE THAT PERFORMS A CONTINUOUS RECEPTION OPERATION

(75) Inventors: Daisuke Kobayashi, Osaka (JP);
Yasuyuki Shintani, Hyogo (JP);
Takashi Murakami, Kyoto (JP)

(73) Assignee: Panasonic Corporation, Osaka (JP)

( * ) Notice: Subject to any disclaimer, the term of this patent is extended or adjusted under 35 U.S.C. 154(b) by 524 days.

(21) Appl. No.: 10/576,294

(22) PCT Filed: May 17, 2005

(86) PCT No.: PCT/JP2005/008996

§ 371 (c)(1),
(2), (4) Date: Apr. 19, 2006

(87) PCT Pub. No.: WO2005/117482

PCT Pub. Date: Dec. 8, 2005

(65) Prior Publication Data

US 2007/0121494 A1    May 31, 2007

(30) Foreign Application Priority Data

May 27, 2004   (JP) .............................. 2004-157383

(51) Int. Cl.
*G08C 17/00*   (2006.01)
(52) U.S. Cl. ...................................... 370/311; 370/282
(58) Field of Classification Search ....................... None
See application file for complete search history.

(56) References Cited

U.S. PATENT DOCUMENTS 5,203,020 A * 4/1993 Sato et al. ..................... 455/68

(Continued)

FOREIGN PATENT DOCUMENTS

JP    10-290472    10/1998

(Continued)

OTHER PUBLICATIONS

Hattori et al. "Technology for Reducing the Power Consumption of Mobile/Personal Handheld Terminals." Electronics and Communications in Japan. vol. 81, No. 3. 1998.*

(Continued)

*Primary Examiner*—Ayaz R Sheikh
*Assistant Examiner*—Peter Chau
(74) *Attorney, Agent, or Firm*—Wenderoth, Lind & Ponack, L.L.P.

(57) ABSTRACT

A communication system in which both a communication device that does not operate intermittently and a communication device that operates intermittently are present. A communication device includes a transmission processing portion transmitting data, a timer portion counting a continuous operation request effective time during which transmitted data is always received, a transmission control portion controlling the transmission processing portion to transmit data including a continuous operation request flag causing the timer portion in a communication device that operates intermittently to start counting the continuous operation request effective time while starting its timer portion counting the continuous operation request effective time, a reception processing portion, and a reception control portion controlling the reception processing portion. Upon receiving the data wherein the flag is set, the reception control portion controls its timer portion to start counting the continuous operation request effective time.

56 Claims, 11 Drawing Sheets

U.S. PATENT DOCUMENTS

| | | | |
|---|---|---|---|
| 5,881,055 A * | 3/1999 | Kondo | 370/311 |
| 6,018,642 A * | 1/2000 | Adachi | 340/7.33 |
| 6,049,708 A * | 4/2000 | Tsujita | 455/334 |
| 2002/0120766 A1 * | 8/2002 | Okajima et al. | 709/232 |
| 2004/0028058 A1 * | 2/2004 | Katoh | 370/395.53 |

FOREIGN PATENT DOCUMENTS

| | | |
|---|---|---|
| JP | 2000-59246 | 2/2000 |
| JP | 2003-87180 | 3/2003 |
| JP | 2005-115901 | 4/2005 |

OTHER PUBLICATIONS

English Translation of: "ECHONET Kikakusho Dai 3 Bu Denso Media to Kai Tsushin Software Shiyo Version 2.11", Nov. 5, 2002, 'Section 3.4.4 Layer 3' (pp. 3-38 to 3-43), [online], Echonet Consortium. [retrieved on Jun. 8, 2005], retrieved from the Internet: <http://www.echonet.gr.jp/8_kikaku/spec/pdf_v211/SpecVer211_3.pdf>.

* cited by examiner

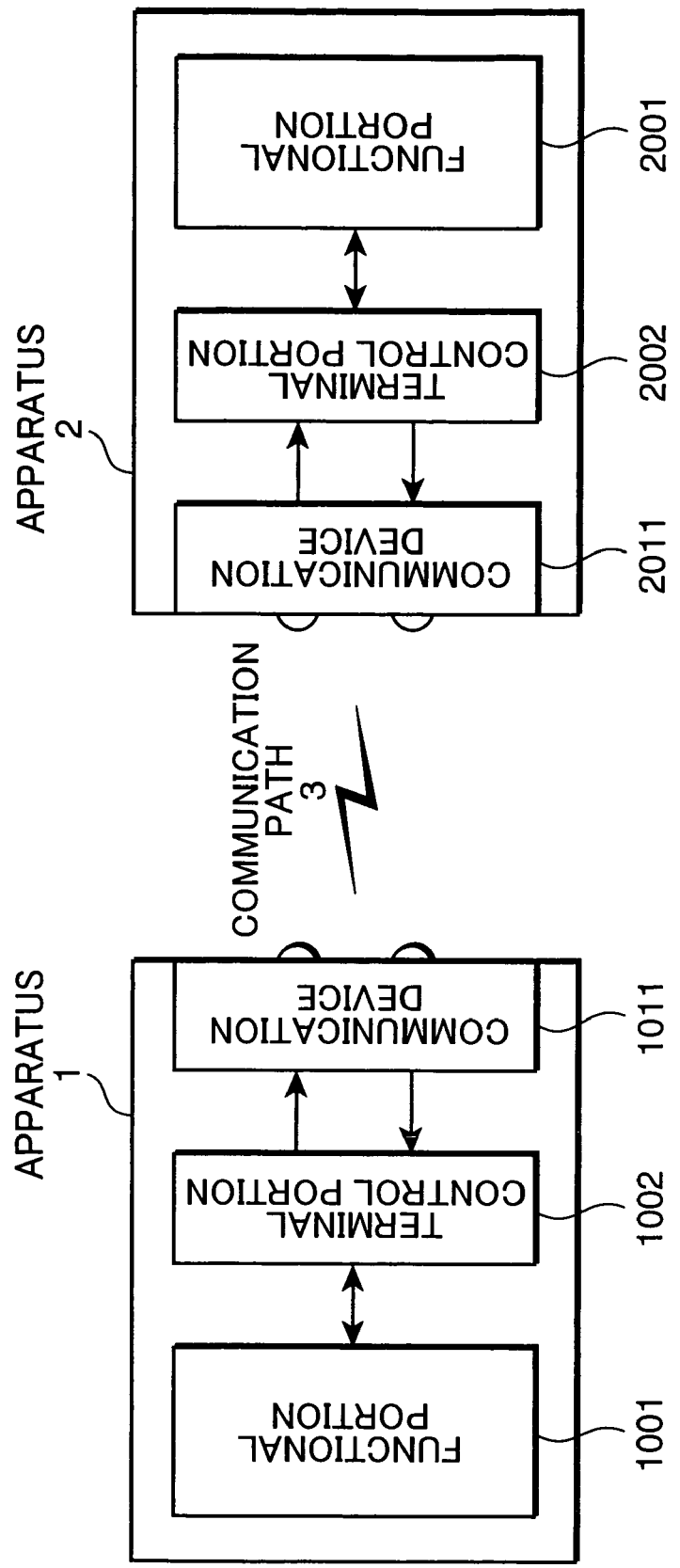

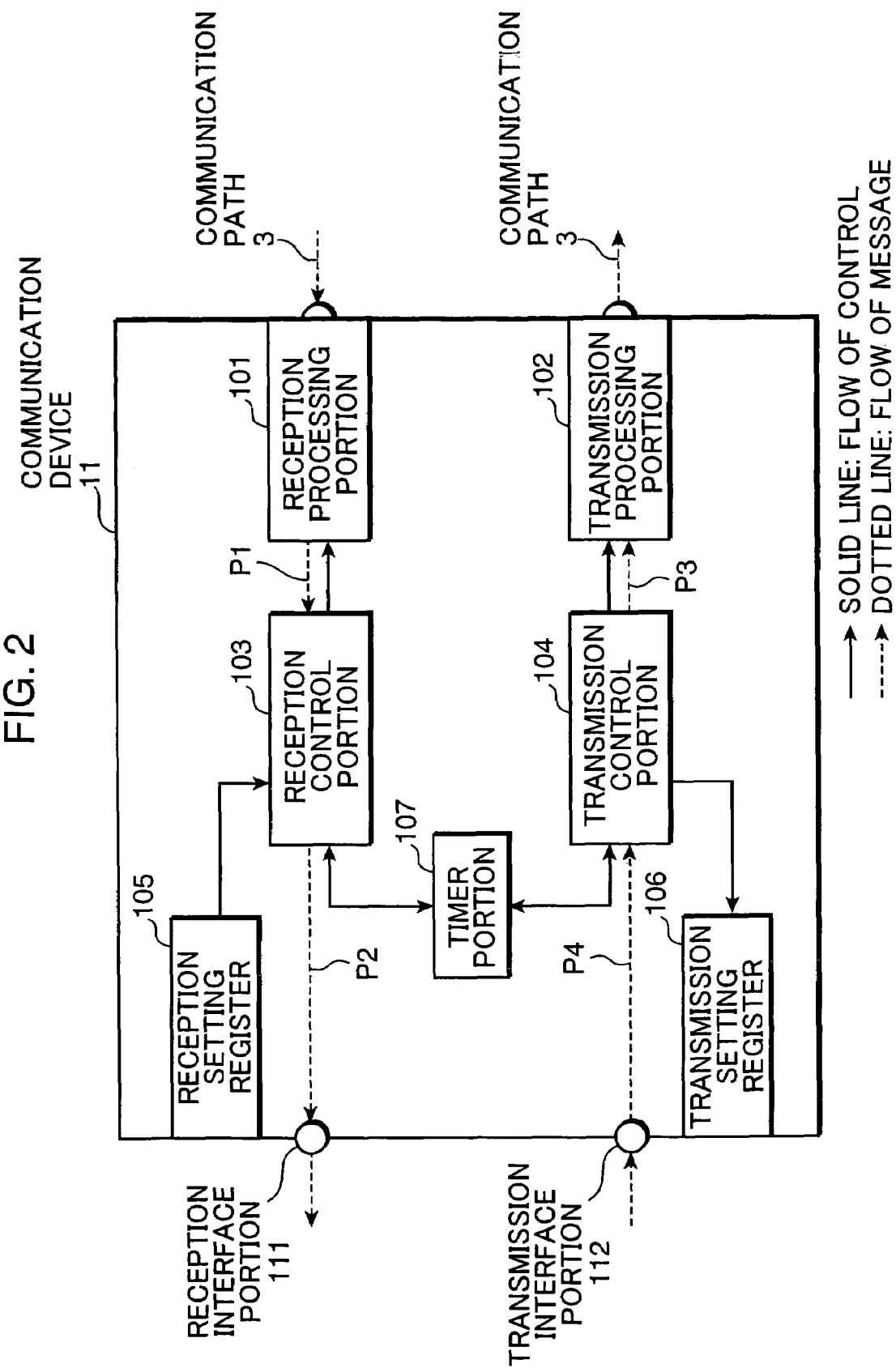

| RECEPTION SETTING REGISTER ||
|---|---|
| INTERMITTENT OPERATION | ASSERTED |
| CONTINUOUS OPERATION | DEASSERTED |

FIG. 4A

| TRANSMISSION SETTING REGISTER ||
|---|---|
| CONTROLLER | APPARATUS PERFORMING INTERMITTENT RECEPTION OPERATION IS ABSENT ON NETWORK/DEASSERTED |
| | APPARATUS PERFORMING INTERMITTENT RECEPTION OPERATION IS PRESENT ON NETWORK/ASSERTED |
| OTHER THAN CONTROLLER | DEASSERTED |

FIG. 4B

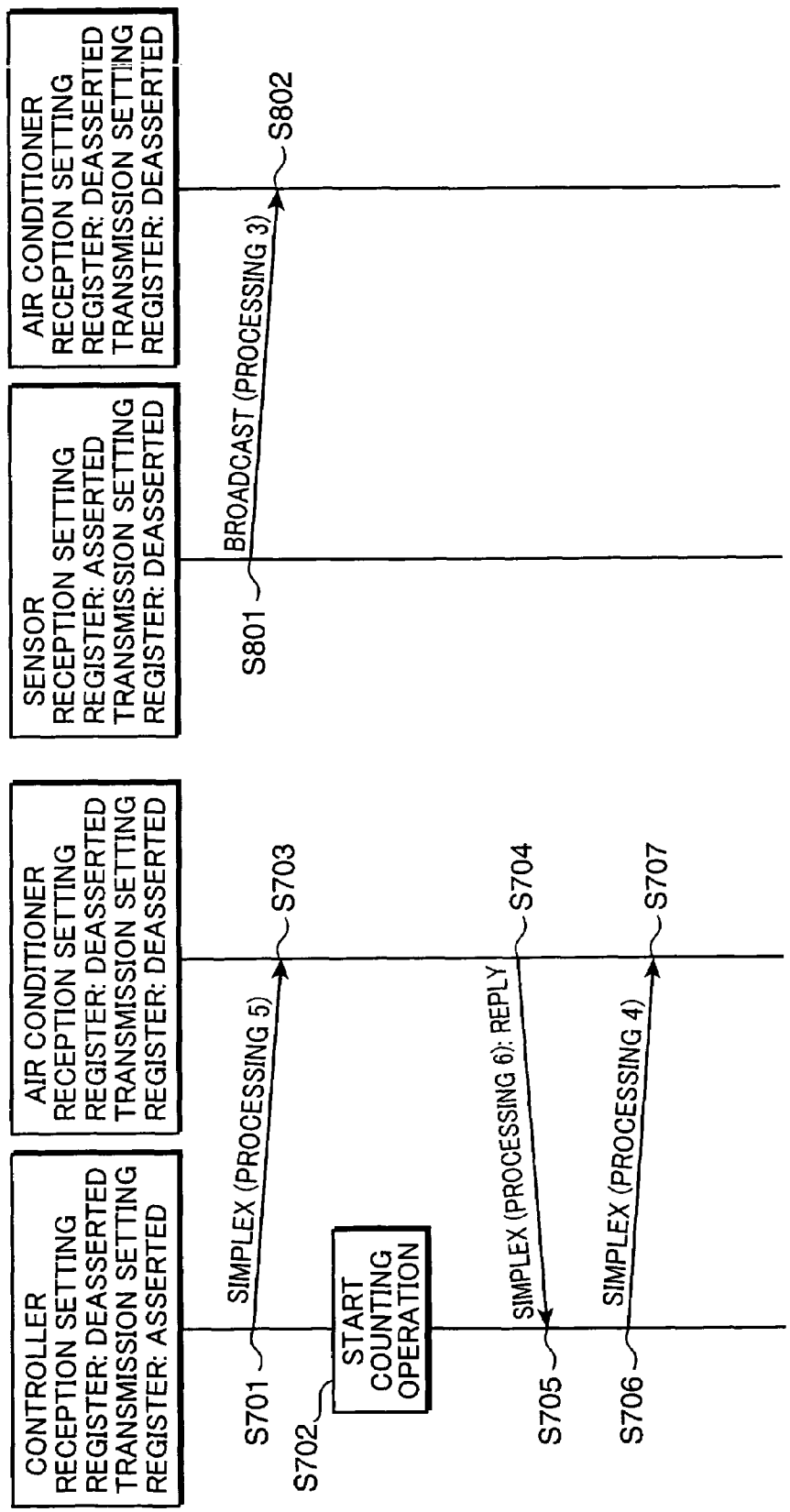

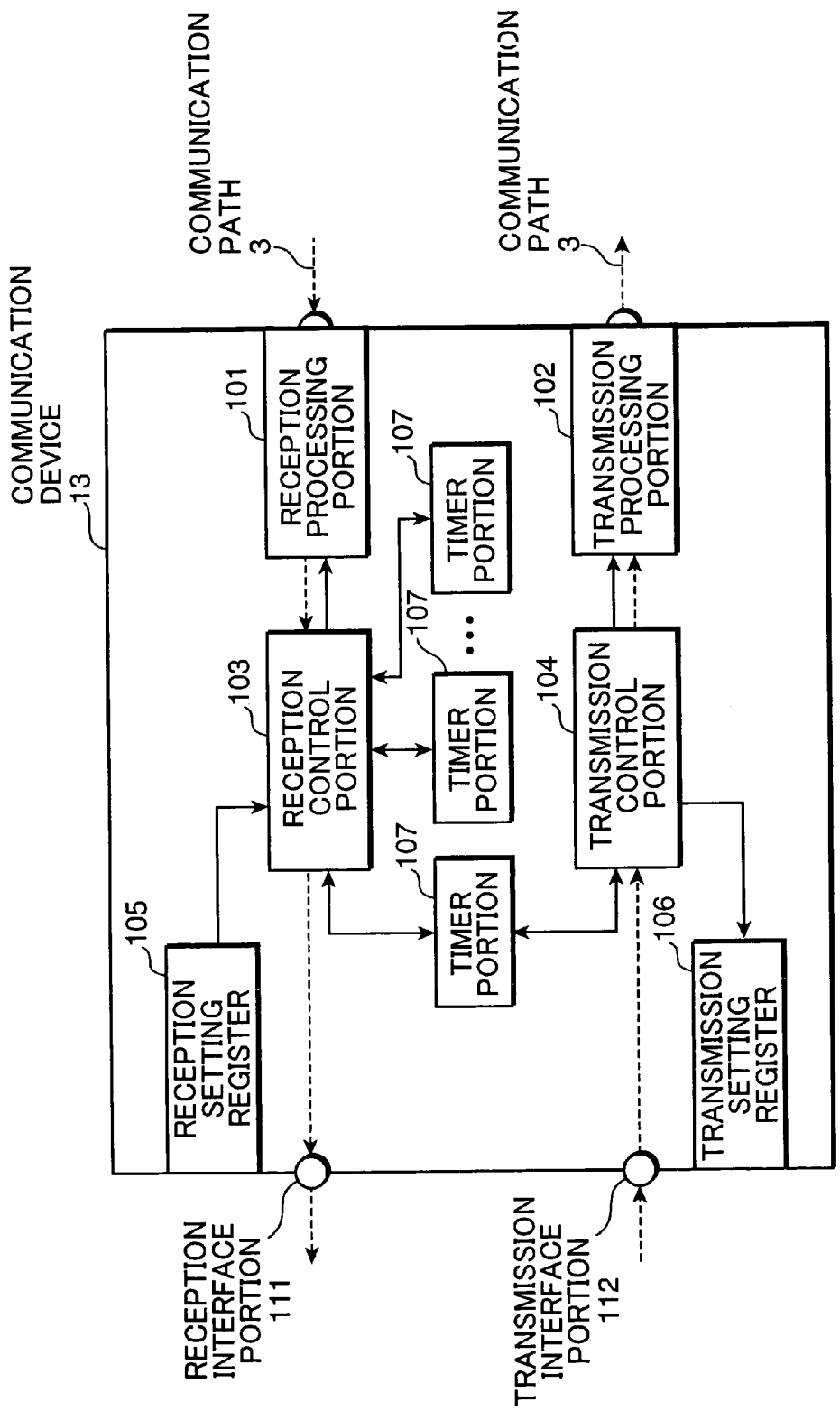

TECHNIQUE FOR ENABLING COMMUNICATION BETWEEN A COMMUNICATION DEVICE THAT PERFORMS AN INTERMITTENT RECEPTION AND A COMMUNICATION DEVICE THAT PERFORMS A CONTINUOUS RECEPTION OPERATION

BACKGROUND OF THE INVENTION

1. Field of the Invention

The present invention relates to a technique for enabling communications between a communication device that performs an intermittent reception operation and a communication device that performs a continuous reception operation.

2. Description of the Art

Patent Document 1 (JP-A-2003-87180) discloses a communication system that enables a receiving station to perform an intermittent reception operation in an irregular transmission radio system having no radio station that regularly transmits a control signal. To be more specific, in a radio communication system comprising a calling station and a called station, the called station in a reception waiting state brings the reception portion into an operating state intermittently for only a time d at a specific cycle (d+t). Meanwhile, the calling station that is to start communications by calling up the reception-waiting called station transmits a reception portion activation signal for a period longer than the cycle (d+t) before it transmits the call number of the called station. Because the reception portion of the called station is brought into an operating state for the time d at the cycle (d+t), the called station is able to trap the activation signal longer than the cycle in a reliable manner and thereby brings the reception portion in a continuous operating state.

BRIEF DISCLOSURE OF THE INVENTION

The technique in Patent Document 1 can bring the receiving station that operates intermittently into a continuous operating state in a reliable manner. However, because the called station stays in the continuous operating state thereafter, there arises a problem that power saving cannot be achieved in the called station.

An object of the invention is therefore to provide a communication device and a communication method that enables high-speed communications between communication devices in a communication system having both a communication device that does not operate intermittently and a communication device that operates intermittently while achieving power saving in the communication device that operates intermittently.

A communication device of the invention is a communication device applied to each of apparatuses forming a network system, the plural apparatuses including at least one intermittent apparatus that receives data intermittently, the communication device being characterized by including: transmission processing means for transmitting various kinds of data; timer means for counting a continuous operation request effective time during which transmitted data is always received; transmission control means for controlling the transmission processing means to transmit data in which is set continuous operation request information causing the timer means in a communication device applied to the intermittent apparatus to start counting the continuous operation request effective time, and for starting its own timer means to count the continuous operation request effective time; reception processing means for receiving various kinds of data; and reception control means for controlling the reception processing means, wherein the reception control means in the communication device applied to the intermittent apparatus starts its own timer means to count the continuous operation request effective time upon receipt of the data in which is set the continuous operation request information at its own reception processing means.

According to this configuration, the communication device at the transmission end transmits the data in which the continuous operation request information is set, and starts the timer means to count a specific continuous operation request effective time. Meanwhile, the communication device that operates intermittently by alternately repeating a reception enabled period and a reception suspended period starts the timer means to count the continuous operation request effective time upon receipt of the data in which the continuous operation request information is set. The communication device that operates intermittently then shifts from an intermittent operation state to a continuous operation state during which data is always received within the continuous operation request effective time.

Hence, when the communication device at the transmission end is within the continuous operation request effective time, the communication device that operates intermittently is also within the continuous operation request effective time. Data transmitted within this time is therefore received at the communication device that operates intermittently. The communication device at the transmission end can thus make the communication device that operates intermittently receive data by transmitting the data within the continuous operation request effective time, that is, while its own timer means is performing a counting operation, without the need to constantly monitor the communication device for transmitting the data by choosing a proper reception enabled period during an intermittent operation.

It is thus possible to eliminate data reception mistakes of the communication device that operates intermittently, which enables high-speed data communications to be achieved at high efficiency. Also, power saving can be achieved in the communication device that operates intermittently because it operates intermittently when it is outside the continuous operation request effective time.

BRIEF DESCRIPTION OF THE DRAWINGS

FIG. 1 is a view showing the configuration of a network system constructed from apparatuses to each of which a communication device according to a first embodiment of the invention is applied.

FIG. 2 is a block diagram showing the configuration of the communication device according to the first embodiment of the invention.

FIGS. 4A and 4B are tables showing setting conditions of a reception setting register and a transmission setting register.

FIGS. 9A and 9B are other sequence views of the communication device according to the first embodiment of the invention.

FIG. 11 is a block diagram showing the configuration of a communication device according to a third embodiment of the invention.

DETAILED DESCRIPTION OF THE INVENTION

Figure 3A:
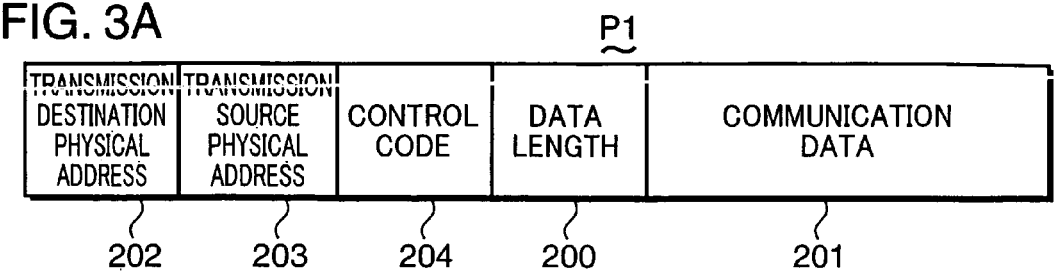
FIGS. 3A to 3F are views showing the data structure of packets used in the communication device according to the first embodiment of the invention.

Hereinafter, embodiments of the invention will be described with reference to the drawings.

First Embodiment

FIG. 1 is a view showing a network system constructed from an apparatus 1 and an apparatus 2 to each of which a communication device according to a first embodiment is applied. The apparatus 1 and the apparatus 2 can be apparatuses having the same functions or apparatuses having totally different functions.

The apparatus 1 includes a communication device 1011, a functional portion 1001, and a terminal control portion 1002. The functional portion 1001 performs various kinds of processing to achieve various functions provided to the apparatus 1. The terminal control portion 1002 controls the communication device 1011 by performing processing to request the communication device 1011 to perform communication processing when the functional portion 1001 makes communications with the apparatus 2 or another unillustrated apparatus.

The communication device 1011 is furnished with a function of performing a radio transmission by receiving a communication request and communication data from the terminal control portion 1002, a function of extracting a packet from a signal received from a communication path 3 and notifying the terminal control portion 1002 of the packet, etc.

As with the apparatus 1, the apparatus 2 includes a functional portion 2001 that performs various kinds of processing to achieve various functions provided to the apparatus 2, a terminal control portion 2002 that controls a communication device 2011, and the communication device 2011.

The communication devices 1011 and 2011 are of the identical configuration, and are characterized in that a communication device 11 shown in FIG. 2 is applied to each. Numerals 1 and 2 are labeled to the apparatuses in FIG. 1. However, numeral 1 alone is labeled to the apparatuses hereinafter.

As the communication path 3, a radio communication path, such as the ECHONET, a wireless LAN, and the UWB, is adopted. However, the invention is not limited to this configuration, and a cable communication path can be adopted as well.

FIG. 2 is a block diagram showing the configuration of the communication device 11 according to the first embodiment of the invention. As is shown in FIG. 2, the communication device 11 includes a reception processing portion 101, a transmission processing portion 102, a reception control portion 103, a transmission control portion 104, a reception setting register 105, a transmission setting register 106, a timer portion 107, a reception interface portion 111, and a transmission interface portion 112. In FIG. 2, a solid line indicates the flow of a control signal and a dotted line indicates the flow of communication data (message).

The reception processing portion 101 is switched between a reception enabled state and a reception suspended state under the control of the reception control portion 103, and the power saving is achieved by switching to the reception suspended state. During operations, the reception processing portion 101 waits for a signal from the communication path 3, and upon receipt of a signal addressed to its own station, it extracts a packet P1 from the reception signal and delivers the packet P1 to the reception control portion 103.

FIG. 3A is a view showing the data structure of the packet P1 delivered from the reception processing portion 101 to the reception control portion 103. As is shown in FIG. 3A, the packet P1 includes a transmission destination physical address portion 202, a transmission source physical address portion 203, a control code portion 204, a data length portion 200, and a communication data portion 201. The transmission destination physical address portion 202 stores the address of the communication device 11 at the transmission destination during a simplex transmission and the broadcast address during a broadcast transmission.

The transmission source physical address portion 203 stores the address of the communication device 11 at the transmission source forming the network system. The control code portion 204 stores a control code used to control operations of the communication device 11 in the apparatus 1 at the reception end. The control code includes a continuous operation request flag (continuous operation request information) requesting the communication device 11 in the apparatus 1 at the reception end to maintain the reception enabled state over a specific period (continuous operation request effective time) without shifting to the reception suspended state for a specific time since the reception.

The data length portion 200 stores the data length of a message stored in the communication data portion 201. The communication data portion 201 stores a message that the functional portion 1001 in the apparatus 1 is to transmit. It should be noted that the communication device 11 does not decode a message stored in the communication data portion 201.

The reception setting register 105 is, for example, a 1-bit register that can be set by the terminal control portion 1002. In this embodiment, the reception setting register 105 is asserted when data indicating "1" is written and deasserted when data indicating "0" is written.

When the reception setting register 105 is asserted at the initialization, the reception control portion 103 sets the reception processing portion 101 to a continuous reception mode, and when the reception setting register 105 is deasserted, it sets the reception processing portion 101 to an intermittent reception mode.

The reception control portion 103 includes a timer that counts a reception enabled period and a reception suspended period in the intermittent reception mode during which the reception enabled period and the reception suspended period are repeated alternately at a specific intermittent cycle. The intermittent cycle referred to herein means a total time of the reception enabled period and the reception suspended period.

Further, when the reception processing portion 101 is set to the continuous reception mode, the reception control portion 103 constantly sets the reception processing portion 101 to the reception enabled state, and when the reception processing portion 101 is set to the intermittent reception mode, it brings the reception processing portion 101 into the reception enabled state only during the reception enabled period counted by the timer and within the continuous operation request effective time counted by the timer portion 107. Herein, the continuous operation request effective time is set longer than the reception enabled period, and the reception processing portion 101 is constantly brought into the reception enabled state within the continuous operation request effective time.

Further, the reception control portion 103 decodes the transmission source physical address of the packet P1 received from the reception processing portion 101, and converts the decoded transmission source physical address to a transmission source logical address to generate a packet P2 including the converted transmission source logical address, after which it delivers the packet P2 to the reception interface portion 111.

Figure 3B:
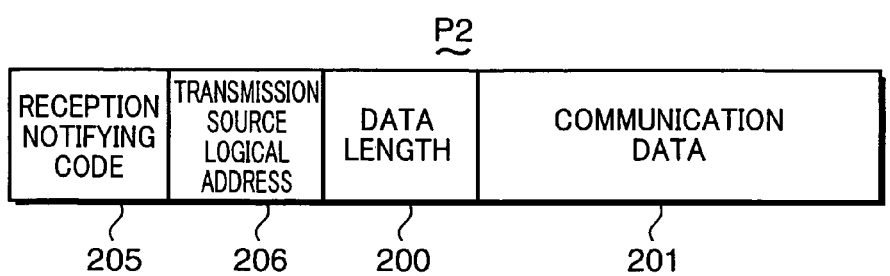

FIG. 3B is a view showing the data structure of the packet P2. As is shown in FIG. 3B, the packet P2 includes a reception notifying code portion 205, a transmission source logical address portion 206, a data length portion 200, and a communication data portion 201. The reception notifying code portion 205 stores a reception notifying code, which is a code to notify the terminal control portion 1002 of the reception of a message at the communication device 11. The transmission source logical address portion 206 stores the transmission source logical address. The data length portion 200 and the communication data portion 201 store the data length and a message, respectively, as in the packet P1.

The reception control portion 103 shown in FIG. 2 decodes the control code in the packet P1 received from the reception processing portion 101, and requests the timer portion 107 to reset the count and start a counting when the continuous operation request flag included in the control code is enabled.

The reception interface portion 111 is an interface used to deliver the packet P2 to the terminal control portion 1002.

The transmission processing portion 102 performs processing by which a packet P3 received from the transmission control portion 104 is converted to a specific signal to transmit the packet P3 to the communication path 3 by a broadcast or simplex transmission. The transmission processing portion 102 performs either processing by which the packet P3 is transmitted repetitively over a period longer than the intermittent cycle when the packet P3 is to be transmitted to another apparatus 1 that performs an intermittent reception operation within the network system so that the apparatus 1 is able to receive the packet P3, or processing by which the packet P3 is transmitted only once to another apparatus 1 that performs a continuous reception operation.

Figure 3C:
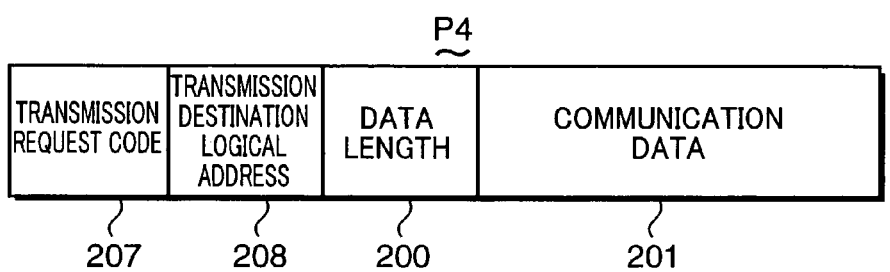
Figure 3D:
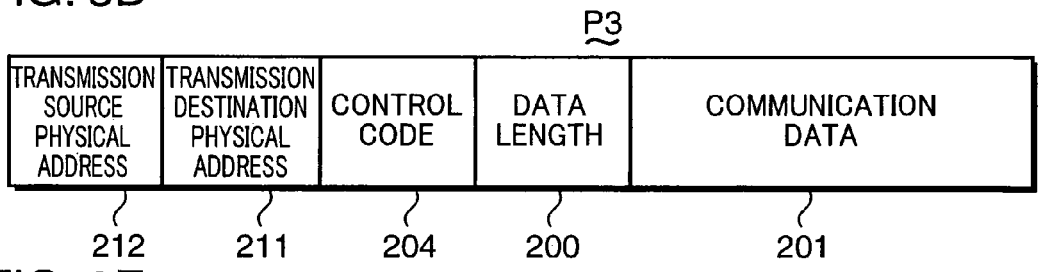

The packet P3 delivered from the transmission control portion 104 to the transmission processing portion 102 is of the same configuration as the packet P1 delivered from the reception processing portion 101 to the reception control portion 103. FIG. 3D is a view showing the data structure of the packet P3. The packet P3 includes a transmission source physical address portion 212, a transmission destination physical address portion 211, a control code portion 204, a data length portion 200, and a transmission data portion 201. The transmission source physical address portion 212 stores the physical address of the apparatus 1 at the transmission end. The transmission destination physical address portion 211 stores the physical address of the apparatus 1 at the reception end. The control code portion 204, the data length portion 200, and the communication data portion 201 store the control code, the data length, and a message, respectively, as in the packet P1.

The transmission control portion 104 starts transmission control processing upon input of a packet P4 from the transmission interface portion 112. FIG. 3C is a view showing the data structure of the packet P4. As is shown in FIG. 3C, the packet P4 includes a transmission request code portion 207, a transmission destination logical address portion 208, a data length portion 200, and a communication data portion 201.

The transmission request code portion 207 stores a transmission request code, which is a code indicating that the terminal control portion 1002 requests the communication device 11 to transmit a message in communications with the terminal control portion 1002. The transmission destination logical address portion 208 stores the logical address or the broadcast address of the apparatus 1 at the reception end. When the broadcast address is stored, it means that a broadcast transmission is requested. The data length portion 200 stores the data length of a message stored in the communication data portion 201. The communication data portion 201 stores a message that the functional portion 1001 shown in FIG. 1 is to transmit. It should be noted that the content of the message stored in the communication data portion 201 is not decoded in the communication device 11.

The transmission control portion 104 decodes the transmission destination logical address in the packet P4 received from the transmission interface portion 112, and converts the decoded address to the transmission destination physical address. Also, the transmission control portion 104 reads out the states of the transmission setting register 106 and the timer portion 107 to generate the packet P3 including the control code in which is set the continuous operation request flag that matches with a combination of conditions set forth in Table 1 below, and delivers the packet P3 to the transmission processing portion 102. When the continuous operation request flag is set in the control code, the transmission control portion 104 requests the timer portion 107 to reset the cont and start a counting.

Also, the transmission control portion 104 controls the transmission processing portion 102 to perform either processing by which the packet P3 is transmitted repetitively over a period longer than the intermittent cycle or processing by which the packet P3 is transmitted only once, depending on the combination of conditions set forth in Table 1 below.

The transmission setting register 106 is a 1-bit register that can be set by the terminal control portion 1002 shown in FIG. 2. When data indicating "1" is written, it is asserted, and when data indicating "0" is written, it is deasserted.

In a case where the apparatus 1 is a controller, the terminal control portion 1002 shown in FIG. 1 checks whether at least one apparatus 1 that operates intermittently is present on the network system. When at least one apparatus 1 that performs an intermittent reception operation is present on the network system, the terminal control portion 1002 asserts the transmission setting register 106, and when the apparatus 1 that performs an intermittent reception operation is totally absent on the system, it deasserts the transmission setting register 106.

Also, in a case where the apparatus 1 is an apparatus other than the controller, the terminal control portion 1002 deasserts the transmission setting register 106. The setting of the transmission setting register 106 is performed only at the initialization of the communication device 11, when the apparatus 1 is newly connected to the network system, or when the configuration of the network system is changed, for example, by disconnecting the apparatus 1 from the network system, and no setting is performed in a normal state.

The transmission interface portion 112 is an interface used to receive data from the terminal control portion 1002.

The timer portion 107 shown in FIG. 2 is in a reset state when the communication device 11 is activated, and the count is reset and a counting is started at arbitrary timing by the reception control portion 103 and the transmission control portion 104.

The timer portion 107 stops the counting when a specific continuous operation request effective time has passed since the counting was started. A period from the start to the stop is defined as within the continuous operation request effective time, and a period other than this period is defined as outside the continuous operation request effective time. A value of the continuous operation request effective time is a value held fixedly in the timer portion 107, and the same value is adopted in all the apparatuses 1. Also, the value of the continuous operation request effective time is the same whether the counting is started by the reception control portion 103 or the counting is started by the transmission control portion 104. It is preferable that the value of the continuous operation request effective time is set to a value at which incoming and outgoing messages can be transmitted several times in the continuous operation mode.

In the communication device 11 configured as described above, the transmission control portion 104 switches processing in six ways as set forth in Table 1 below depending on the combinations of three kinds of conditions.

state of being outside the continuous operation request effective time. The transmission control portion 104 therefore generates the packet P3 in which the continuous operation request flag is set in the control code, and controls the transmission processing portion 102 so that the packet P3 is transmitted repetitively.

Processing 3 is the processing performed when Condition 1 falls under a broadcast transmission and Condition 2 falls under the state of being deasserted regardless of Condition 3. The transmission control portion 104 therefore generates the packet P3 in which the continuous operation request flag is set in the control code, and controls the transmission processing portion 102 so that the packet P3 is transmitted only once.

Processing 4 is the processing performed when Condition 1 falls under a simplex transmission, Condition 2 falls under the state of being asserted, and Condition 3 falls under the state of being within the continuous operation request effective time. The transmission control portion 104 therefore generates the packet P3 in which the continuous operation request flag is not set in the control code, and controls the transmission processing 102 so that the packet P3 is transmitted only once.

TABLE 1

| Processing | Condition 1 Type of Request | Condition 2 Transmission Setting Register | Condition 3 State of Timer Portion | Processing by Transmission Control Portion | |
|---|---|---|---|---|---|
| | | | | Continuous Operation Request Flag | Transmission Control |
| 1 | Broadcast Processing | Asserted | Within Continuous Operation Request Effective Time | Set | Single Transmission |
| 2 | | | Outside Continuous Operation Request Effective Time | Set | Repetitive Transmission |
| 3 | | Deasserted | — | Set | Single Transmission |
| 4 | Simplex Processing | Asserted | Within Continuous Operation Request Effective Time | Not Set | Single Transmission |
| 5 | | | Outside Continuous Operation Request Effective Time | Set | Repetitive Transmission |
| 6 | | Deasserted | — | Not Set | Single Transmission |

In Table 1 above, Condition 1 is distinguished by a type of request specifying whether a broadcast transmission or a simplex transmission is requested. Condition 2 is distinguished by whether the transmission setting register 106 is asserted or deasserted. Condition 3 is distinguished by a state of the timer portion 107.

Processing 1 is the processing performed when Condition 1 falls under a broadcast transmission, Condition 2 falls under the state of being asserted, and Condition 3 falls under the state of being within the continuous operation request effective time. The transmission control portion 104 therefore generates the packet P3 in which the continuous operation request flag is set in the control code, and controls the transmission processing portion 102 so that the packet P3 is transmitted only once.

Processing 2 is the processing performed when Condition 1 falls under a broadcast transmission, Condition 2 falls under the state of being asserted, and Condition 3 falls under the Processing 5 is the processing performed when Condition 1 falls under a simplex transmission, Condition 2 falls under the state of being asserted, and Condition 3 falls under the state of being outside the continuous operation request effective time. The transmission control portion 104 therefore generates the packet P3 in which the continuous operation request flag is set in the control code, and controls the transmission processing 102 so that the packet P3 is transmitted repetitively.

Processing 6 is the processing performed when Condition 1 falls under a simplex transmission and Condition 2 falls under the state of being deasserted regardless of Condition 3. The transmission control portion 104 therefore generates the packet P3 in which the continuous operation request flag is not set in the control code, and controls the transmission processing portion 102 so that the packet P3 is transmitted only once.

FIG. 4A is a table showing the setting conditions of the reception setting register 105. FIG. 4B is a table showing the setting conditions of the transmission setting register 106. As is shown in FIG. 4A, the reception setting register 105 is asserted in the apparatus 1 that operates intermittently, whereas the reception setting register 105 is deasserted in the apparatus 1 that operates continuously.

Meanwhile, as is shown in FIG. 4B, in the apparatus 1 other than the controller, the transmission setting register 106 is deasserted. The apparatus 1 comprising the controller is deasserted when the apparatus 1 that operates intermittently is absent on the network, and asserted when at least one apparatus 1 that operates intermittently is present on the network.

Figure 5:
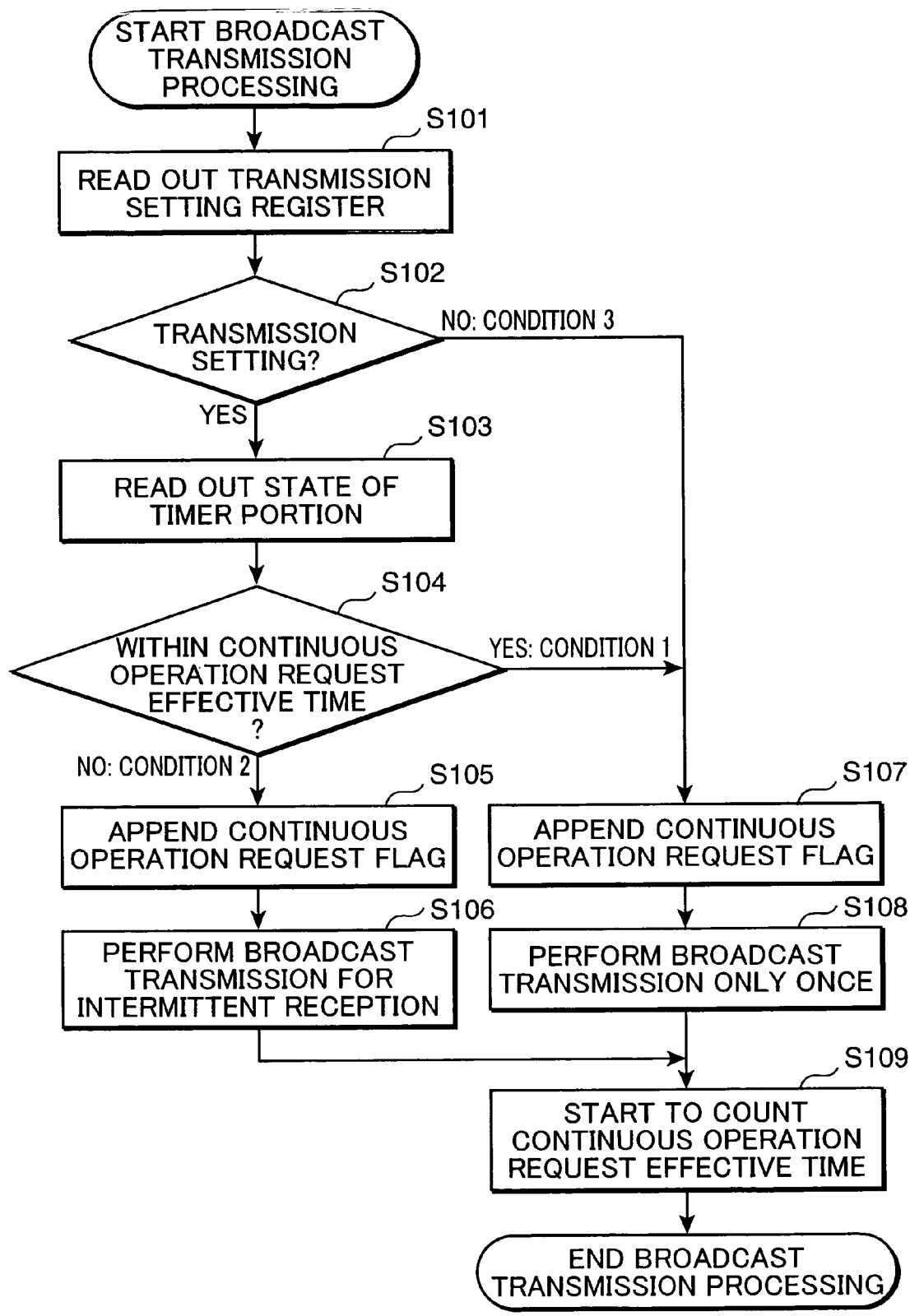
FIG. 5 is a flowchart detailing the procedure of broadcast transmission processing by the communication device according to the first embodiment of the invention.

Processing by the transmission control portion 104 in a case where the communication device 11 receives a message together with a broadcast transmission request from the terminal control portion 1002 will now be described using the flowchart of FIG. 5. Initially, data is read out from the transmission setting register 106 (S101), and whether the transmission setting register 106 is asserted is judged (S102).

In a case where the transmission setting register 106 is asserted, that is, in a case where the apparatus 1 that performs an intermittent reception is included in the network system (YES in S102), the state of the timer portion 107 is read out (S103), and whether it is within the continuous operation request effective time is judged (S104).

When the timer portion 107 is outside the continuous operation request effective time (NO in S104), the packet P3 in which is appended the continuous operation request flag to the control code is generated (S105), and the transmission processing portion 102 is controlled in such a manner that the packet P3 is transmitted repetitively over a period longer than the intermittent cycle by a broadcast transmission (S106).

When it is judged that the transmission setting register is deasserted in Step S102, that is, in a case where the apparatus 1 is the controller and no apparatus 1 that operates intermittently is included in the network system, in a case where the apparatus 1 is an apparatus other than the controller (NO in S102), or when it is judged that the timer portion 107 is within the continuous operation request effective time in Step S104 (YES in S104), the packet P3 in which is set the continuous operation request flag in the control code is generated (S107). The transmission processing portion 102 is then controlled in such a manner that the packet P3 is transmitted only once by a broadcast transmission (S108).

In S109, the timer portion 107 is started to count the continuous operation request effective time, and the transmission processing is terminated. The branching to NO in Step S102 corresponds to Processing 3 in Table 1 above, the branching to YES in Step S104 corresponds to Processing 1 in Table 1, and the branching to NO in Step S104 corresponds to Processing 2 in Table 1.

Figure 6:
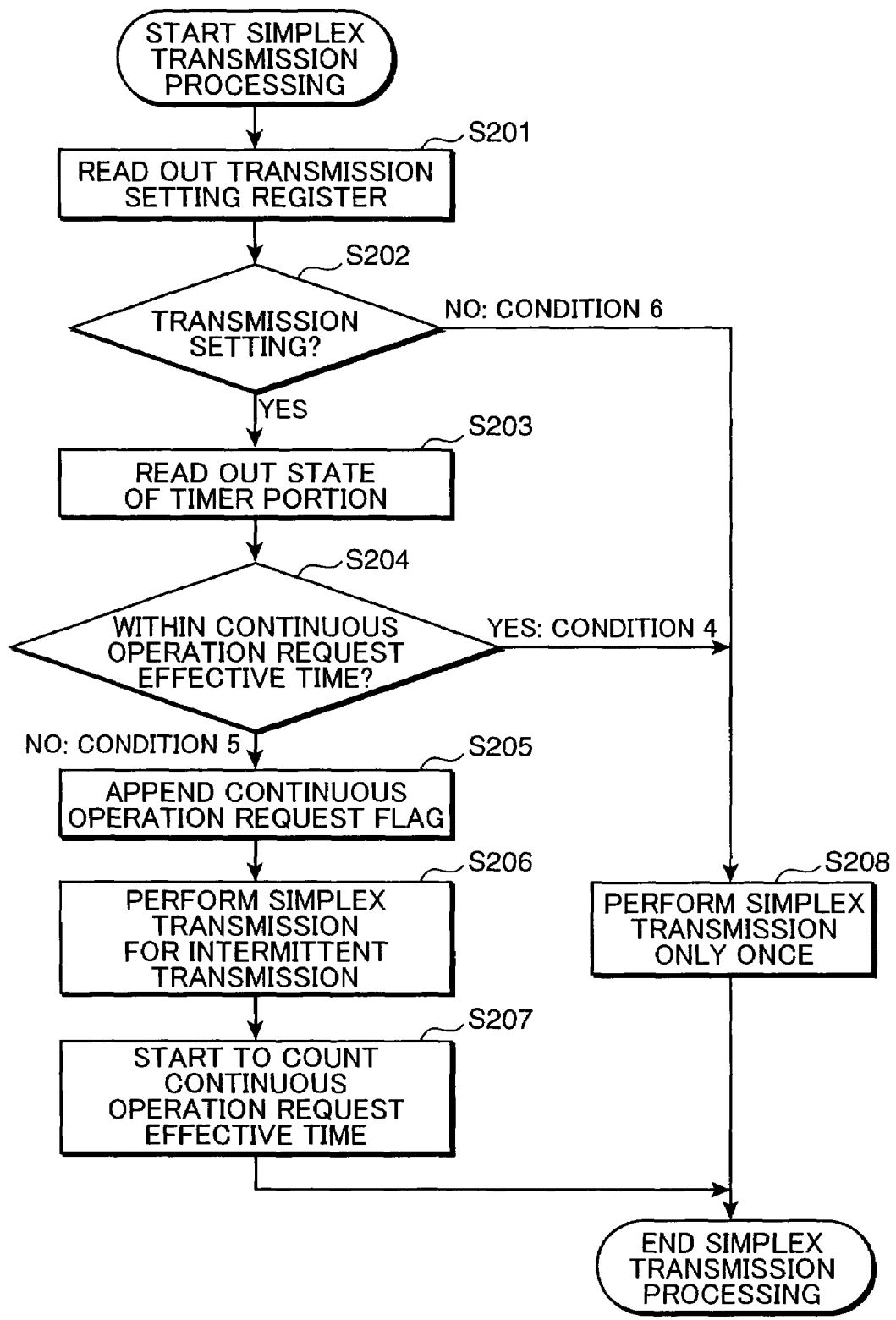
FIG. 6 is a flowchart detailing the procedure of simplex transmission processing by the communication device according to the first embodiment of the invention.

Processing by the transmission control portion 104 in a case where the communication device 11 receives a message together with a simplex transmission request from the terminal control portion 1002 will now be described using the flowchart of FIG. 6. Because processing in Steps S201 through S204 is the same as the processing in Steps S101 through S104 shown in FIG. 5, descriptions of these steps are omitted.

When the timer portion 107 is judged as being outside the continuous operation request effective time in Step S204 (NO in S204), the packet P3 in which is set the continuous operation request flag in the control code is generated (S205). The transmission processing portion 102 is then controlled in such a manner that the packet P3 is transmitted repetitively over a period longer than the intermittent cycle by a simplex transmission (S206), and the timer portion 107 is started to count the continuous operation request effective time (S207). When the transmission setting register 106 is judged as being deasserted in Step S202 (NO in S202), or when the timer portion 107 is judged as being within the continuous operation request effective time in S204 (YES in S204), the packet P3 is transmitted only once by a simplex transmission (S208), and the transmission processing is terminated.

The branching to NO in Step S202 corresponds to Processing 6 in Table 1 above, the branching to YES in Step S104 corresponds to Processing 4 in Table 1, and the branching to NO in Step S104 corresponds to Processing 5 in Table 1.

Figure 7:
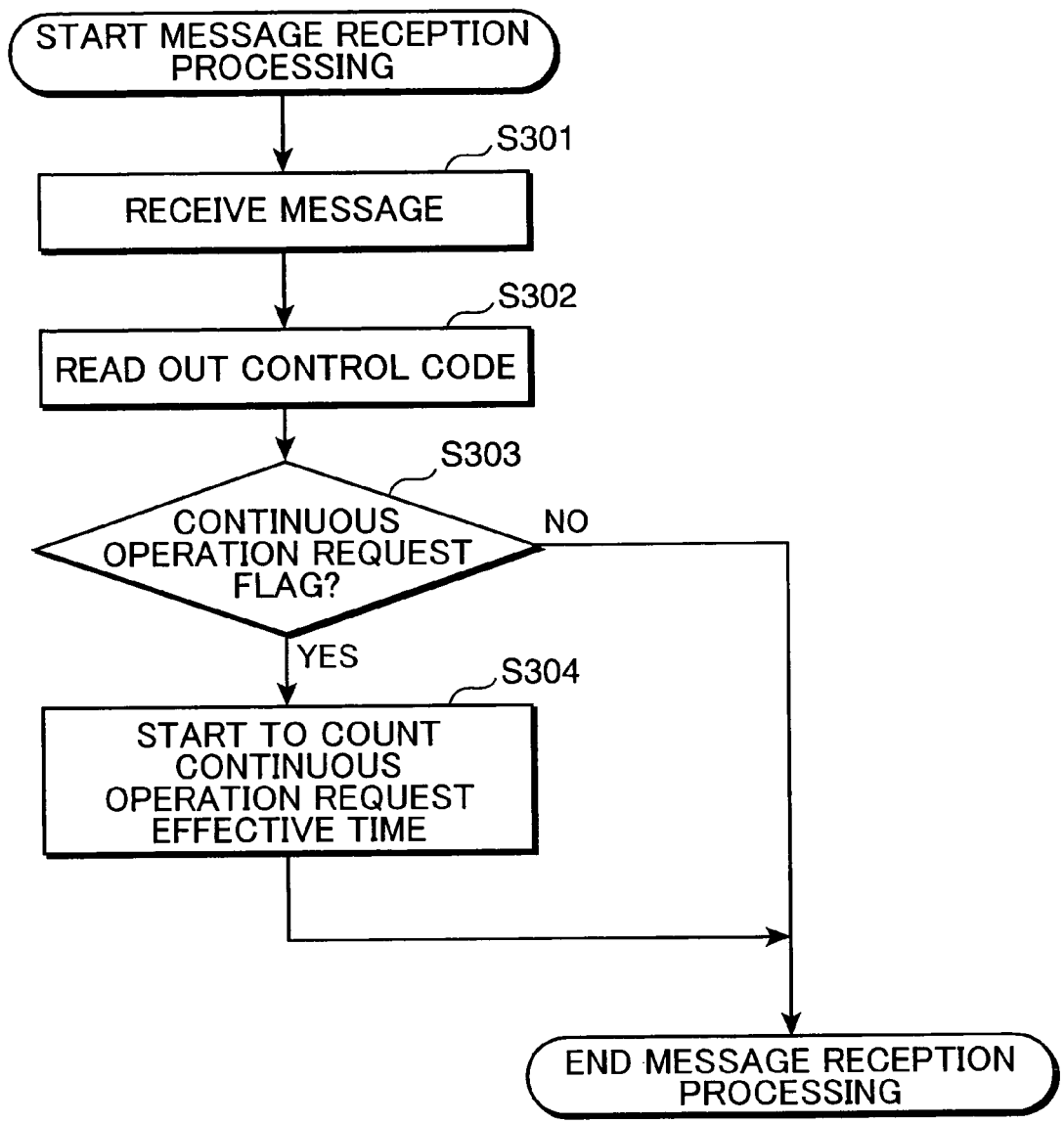
FIG. 7 is a flowchart detailing the procedure of reception processing by the communication device according to the first embodiment of the invention.

FIG. 7 is a flowchart detailing message reception processing by the reception control portion 103. Initially, when the reception processing portion 101 receives the packet P1 including the message in a reception enabled state (S301), the transmission control portion 104 reads out the control code from the packet P1 (S302), and judges whether the continuous operation request flag is set in the control code (S303).

When the continuous operation request flag is not set in the control code (NO in S303), the reception processing is terminated immediately. Meanwhile, when the continuous operation request flag is set in the control code (YES in S303), the timer portion 107 is started to count the continuous operation request effective time (S304), and the message reception processing is terminated.

For a radio communication system in which at least one controller apparatus 1 that operates continuously is present, it is preferable to apply the communication device 11 according to the first embodiment to all the apparatuses in the radio communication system in achieving the control on the system mainly by communications between the controller apparatus and respective terminals.

As an example of such a radio communication system, a home appliance control network system within a house is known. In many home appliance control network systems, one controller that operates continuously, an apparatus 1 whose radio portion operates continuously by receiving constant power supply, for example, an air conditioner, a refrigerator, a washing machine, a microwave oven, a doorphone, and a TV set, and an apparatus whose radio portion operates intermittently by being driven on a battery, for example, a remote controller and a sensor, are all present on the network system. Each apparatus 1 receives a broadcast or simplex transmission from the controller and the apparatus 1 transmits a simplex transmission to the controller or transmits sensing information by a broadcast transmission as a reply.

A simplex transmission from the apparatus 1 to another apparatus 1 is not actively used in the home appliance control network system in which it is assumed that the apparatus can readily access to and deaccess from the network. Also, in many cases, the system is designed in such a manner that the apparatus 1 that performs an intermittent reception operation does not have to receive a broadcast transmission from the apparatus 1 other than the controller.

Hereinafter, a communication sequence in such a network system will be discussed.

When the apparatus 1 that performs an intermittent reception operation is totally absent on the network system, the transmission setting register 106 in the communication device 11 is deasserted in all the apparatuses 1 including the controller. Processing 3 and Processing 6 set forth in Table 1 above alone are therefore performed.

In other words, in all the packets P3 to be transmitted by a broadcast transmission, the continuous operation request flag is set in the control code, and the packet P3 is transmitted only once. Meanwhile, in all the packets P3 to be transmitted by a simplex transmission, the continuous operation request flag is not set in the control code and the packet P3 is transmitted only once. The continuous operation request flag is set in the packet P3 to be transmitted by a broadcast transmission. However, because all the apparatuses 1 that transmit and receive the packet P3 transmitted by a broadcast transmission operate continuously from the start, the continuous operation request flag has little effect.

In other words, in a case where the apparatus 1 that performs an intermittent reception operation is totally absent on the network system, the packet P3 to be transmitted by a broadcast or simplex transmission takes a communication sequence by which the packet P3 is transmitted only once at arbitrary timing in each type of transmission.

Figures 8A, 8B:
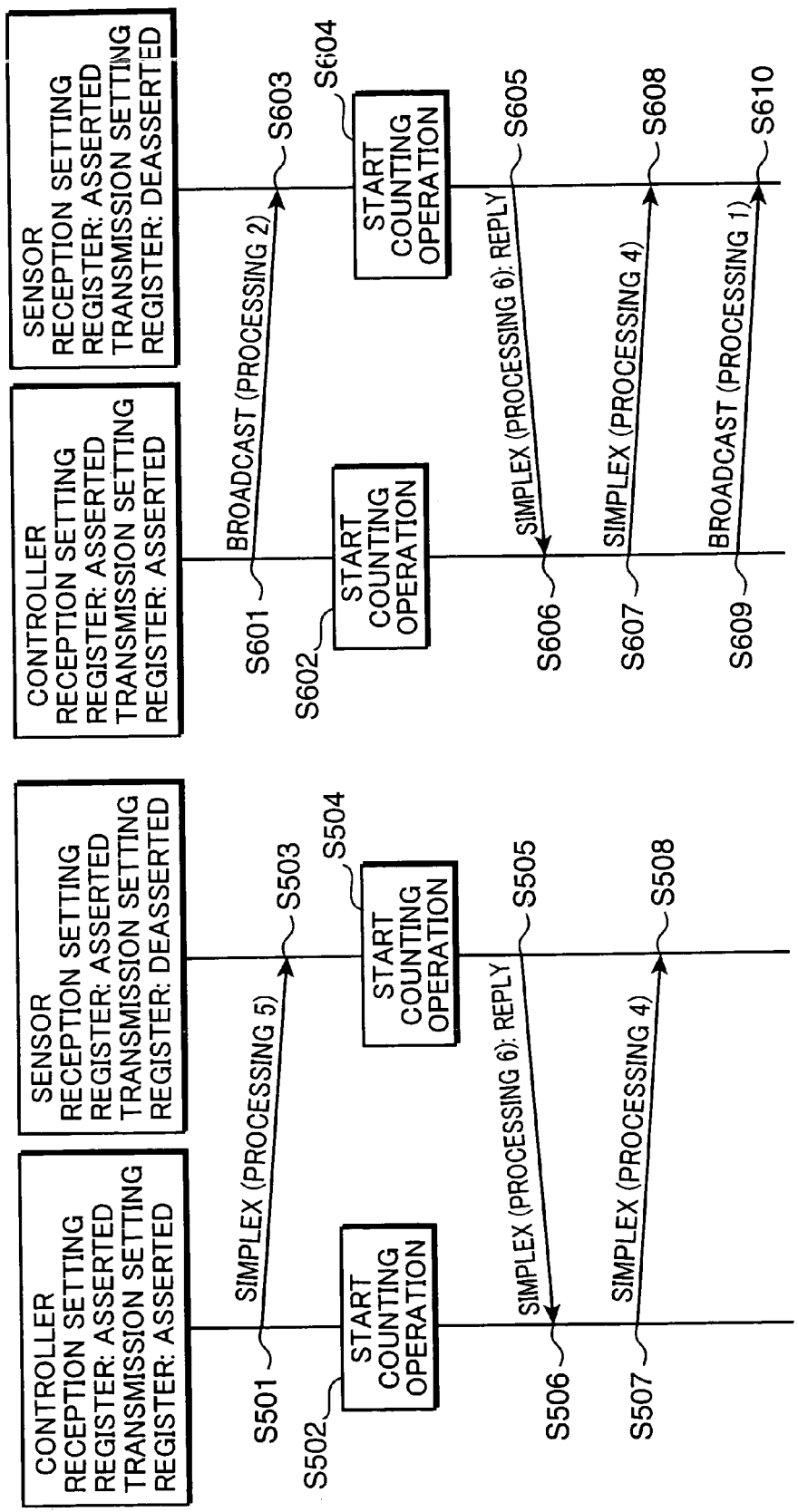
FIGS. 8A and 8B are sequence views of the communication device according to the first embodiment of the invention.

A case where the apparatus 1 that performs an intermittent reception operation is present on the network system and the packet P3 is to be transmitted by a simplex transmission to this apparatus 1 will now be discussed. FIG. 8A is a view showing the communication sequence between a sensor comprising the apparatus 1 that performs an intermittent reception operation and the controller on the network system. In this instance, in the controller, because the controller is the apparatus 1 that performs a continuous reception operation, the reception setting register 105 is asserted, and the transmission setting register 106 is asserted because a sensor that performs an intermittent reception operation is present on the network system.

Meanwhile, because the sensor is the apparatus 1 that performs an intermittent reception operation, the reception setting register 105 is asserted, and the transmission setting register 106 is deasserted because it is an apparatus other than the controller.

Initially, the controller performs Processing 5 in Step S501 by which the packet P3 in which is set the continuous operation request flag in the control code is generated and this packet P3 is transmitted to the sensor repetitively by a simplex transmission. The controller performs Processing 5 on the ground that, as set forth in Table 1 above, Condition 1 for transmitting the packet P3 falls under a simplex transmission, Condition 2 falls under the state of being asserted because the transmission setting register 106 in the controller is asserted, and Condition 3 falls under the state of being outside the continuous operation request effective time because the timer portion 107 has not started a counting operation.

In Step S502, the transmission control portion 104 in the controller controls the timer portion 107 to start a counting operation.

In Step S503, the sensor receives the packet P3 transmitted repetitively from the controller. In Step S504, the reception control portion 103 in the sensor reads out the continuous operation request flag set in the control code in the received packet P3, and controls the timer portion 107 to start a counting operation.

The counting start time of the timer portion 107 in the controller and the counting start time of the timer portion 107 in the sensor almost coincide with each other. The continuous operation request effective time of the controller and the continuous operation request effective time of the sensor are therefore almost synchronized with each other.

In Step S505, the sensor performs Processing 6 by which the packet P3 in which is not set the continuous operation request flag in the control code is generated as a reply message and this packet P3 is transmitted to the controller only once by a simplex transmission. The sensor performs Processing 6 on the ground that, as set forth in Table 1 above, Condition 1 for transmitting the packet P3 falls under a simplex transmission, and Condition 2 falls under the state of being deasserted because the transmission setting register 106 in the sensor is deasserted.

In Step S506, the controller receives the packet P3.

In Step S507, when the controller transmits the packet P3 to the sensor within the continuous operation request effective time, it performs Processing 4 by which the packet P3 in which is not set the continuous operation request flag in the control code is generated and this packet P3 is transmitted to the sensor only once by a simplex transmission.

The controller performs Processing 4 on the ground that Condition 1 falls under a simplex transmission because the packet P3 is to be transmitted by a simplex transmission, Condition 2 falls under the state of being asserted because the transmission setting register 106 in the controller is asserted, and Condition 3 falls under the state of being within the continuous operation request effective time because the timer portion 107 is performing a counting operation.

As has been described, in communications between the controller and the sensor that performs an intermittent reception operation, the sensor remains in the continuous reception mode within the continuous operation request effective time since the first packet P3 is received, and is therefore able to receive the packet P3 constantly within the continuous operation request effective time, which enables high-speed communications to be performed.

A case where more than one apparatus 1 that performs an intermittent reception operation is present on the network and the controller transmits the packet P3 to each apparatus 1 by a simplex transmission will now be discussed. FIG. 8B is a view showing a communication sequence between plural sensors as apparatuses 1 that perform an intermittent reception operation and the controller on the network system.

In this instance, in the controller, the reception setting register 105 is asserted, and the transmission setting register 106 is asserted because the apparatus 1 that performs an intermittent reception operation is present on the network. Meanwhile, because the sensor is not the apparatus 1 that performs a continuous reception operation, the reception setting register 105 is asserted, and the transmission setting register 106 is deasserted because it is the apparatus 1 other than the controller.

Initially, in Step S601, the controller performs Processing 2 by which the packet P3 in which is set the continuous operation request flag in the control code is transmitted to the plural sensors repetitively by a broadcast transmission. The controller performs Processing 2 on the ground that, as set forth in Table 1 above, Condition 1 for transmitting the packet P3 falls under a broadcast transmission, Condition 2 falls under the state of being asserted because the transmission setting register 106 in the controller is asserted, and Condition 3 falls under the state of being outside the continuous operation request effective time because the timer portion 107 is not performing a counting operation.

In Step S602, the transmission control portion 104 in the controller controls the timer portion 107 to start a counting operation.

In Step S603, each sensor receives the packet P3 transmitted repetitively from the controller. In Step S604, the reception control portion 103 in the sensor reads out the continuous operation request flag set in the control code from the received packet P3, and controls the timer portion 107 to start a counting operation.

The counting start time of the timer portion 107 in the controller and the counting start time of the timer portion 107 in each sensor almost coincides with each other. The continuous operation request effective time of the controller and the continuous operation request effective time of each sensor are therefore almost synchronized with each other.

In Step S605, the sensor transmits the packet P3 including a reply message to the controller. Herein, the sensor performs Processing 6 by which the packet P3 in which is not set the continuous operation request flag in the control code is generated and this packet P3 is transmitted to the controller only once by a simplex transmission.

The sensor performs Processing 6 on the ground that Condition 1 falls under a simplex transmission because the packet P3 is to be transmitted by a simplex transmission, and Condition 2 falls under the state of being deasserted because the transmission setting register 106 in the sensor is deasserted.

In Step S606, the controller receives this packet P3. In this instance, the sensor is within the continuous operation request effective time, and is therefore able to receive the packet P3.

In Step S607, when the controller transmits the packet P3 to the sensors by a broadcast transmission within the continuous operation request effective time, it performs Processing 4 by which the packet P3 in which is not set the continuous operation request flag in the control code is generated and this packet P3 is transmitted to each sensor only once by a simplex transmission.

In Step S608, the sensor receives the packet P3. In this instance, the sensor is within the continuous operation request effective time, and is therefore able to receive the packet P3.

In Step S609, in a case where the controller continues to transmit the packet P3 to the sensors by a broadcast transmission within the continuous operation request effective time, it performs Processing 1 by which the packet P3 in which is set the continuous operation request flag in the control code is generated and this packet P3 is transmitted to each sensor only once by a broadcast transmission.

The controller performs Processing 1 on the ground that, as set forth in Table 1 above, Condition 1 falls under a broadcast transmission because the packet P3 is to be transmitted by a broadcast transmission, Condition 2 falls under the state of being asserted because the transmission setting register 106 in the controller is asserted, and Condition 3 falls under the state of being within the continuous operation request effective time because the timer portion 107 is performing a counting operation.

In Step S610, all the sensors receive the packet P3. In this instance, because all the sensors are within the continuous operation request effective time, they are able to receive the packets P3. Also, because the continuous operation request flag is set in the control code in the packet P3, the sensor resets and restarts the timer portion 107. The continuous operation request effective time is thus extended.

As has been described, in communications between the controller and plural sensors that perform an intermittent reception operation, all the sensors remain in the continuous reception mode within the continuous operation request effective time since the first packet P3 was received. Both the apparatuses 1 are thus able to communicate at high speeds within the continuous operation request effective time.

In the description above, the apparatus 1 that is connected to the network system and operates continuously also receives the packet P3 transmitted by a broadcast transmission. However, the apparatus 1 having received the packet P3 decodes the message in the packet P3 in the functional portion 1001, and discards the message by judging the message as an unwanted message. Also, the apparatus 1 that is other than a sensor and operates intermittently also starts a continuous reception operation by receiving the packet P3 transmitted by a broadcast transmission. However, upon receipt of the packet P3, the apparatus 1 that is other than a sensor and operates intermittently decodes the content of the message in the functional portion 1001 and discards the message by judging the message as an unwanted message.

A case where the controller controls an air conditioner, which is the apparatus 1 connected to the network system and performing a continuous reception operation, will now be discussed. FIG. 9A is a view showing a communication sequence between the controller and the air conditioner when the controller initially transmits the packet P3 to the air conditioner by a simplex transmission.

In this instance, in the controller, the reception setting register 105 is deasserted, and the transmission setting register 106 is asserted because the apparatus 1 that performs an intermittent reception operation is present on the network system. Meanwhile, because the air conditioner is the apparatus 1 that performs a continuous reception operation, the reception setting register 105 is deasserted, and the transmission setting register 106 is deasserted because it is the apparatus 1 other than the controller.

Initially, in Step S701, the controller performs Processing 5 by which the packet P3 in which is set the continuous operation request flag in the control code is generated and this packet P3 is transmitted to the air conditioner repetitively by a simplex transmission.

The controller performs Processing 5 on the ground that, as set forth in Table 1 above, Condition 1 falls under a simplex transmission because the packet P3 is to be transmitted by a simplex transmission, Condition 2 falls under the state of being asserted because the transmission setting register 106 in the controller is asserted, and Condition 3 falls under the state of being outside the continuous operation request effective time because the timer portion 107 is not performing a counting operation.

In Step S702, the transmission control portion 104 in the controller controls the timer portion 107 to start a counting operation because the transmission setting register 106 is asserted.

In Step S703, the air conditioner receives the packet P3 transmitted repetitively from the controller. Because the continuous operation request flag is set in the control code in the packet P3 received at the air conditioner, the timer portion 107 in the air conditioner resets and starts a counting operation. It should be noted, however, that because the reception setting register 105 in the air conditioner is deasserted, the reception control portion 103 constantly sets the reception processing portion 101 to be in a reception state regardless of the state of the timer portion 107.

In Step S704, the air conditioner performs Processing 6 by which the packet P3 including the reply message is transmitted to the controller only once by a simplex transmission. The controller performs Processing 6 on the ground that Condition 1 falls under a simplex transmission because the packet P3 is to be transmitted by a simplex transmission and Condition 2 falls under the state of being deasserted because the transmission setting register 106 in the air conditioner is deasserted.

In Step S705, the controller receives this packet P3.

In Step S706, when the controller within the continuous operation request effective time transmits the packet P3 to the air conditioner, it performs Processing 4 by which the packet P3 in which is set the continuous operation request flag in the control code is generated and this packet P3 is transmitted to the air conditioner only once by a simplex transmission. The controller performs Processing 4 on the ground that Condition 1 falls under a simplex transmission because the packet P3 is to be transmitted by a simplex transmission, Condition 2 falls under the state of being asserted because the transmission setting register 106 in the controller is asserted, and Condition 3 falls under the state of being within the continuous operation request effective time because the timer portion 107 is performing a counting operation.

In Step S707, the air conditioner receives this packet P3. In this instance, because the reception setting register 105 in the air conditioner is deasserted, it is always able to receive the packet P3. In this manner, communications are enabled between the controller and the air conditioner that performs a continuous reception operation.

A case where a sensor that operates intermittently transmits sensing information to the air conditioner as the apparatus 1 that is correlated with the sensor and operates continuously by a broadcast transmission will now be described using the sequence of FIG. 9B.

Herein, because the sensor is an apparatus that operates intermittently, the reception setting register 105 is asserted, and the transmission setting register 106 is deasserted because it is an apparatus other than the controller. Meanwhile, because the air conditioner is an apparatus that performs a continuous reception operation, the reception setting register 105 is deasserted, and the transmission setting register 106 is deasserted because it is an apparatus other than the controller.

Initially, in Step S801, the sensor performs Processing 3 by which the packet P3 in which is set the continuous operation request flag in the control code is generated and this packet P3 is transmitted to the air conditioner only once by a broadcast transmission. The sensor performs Processing 3 on the ground that, as set forth in Table 1 above, Condition 1 falls under a broadcast transmission because the packet P3 is to be transmitted by a broadcast transmission, and Condition 2 falls under the state of being deasserted because the transmission setting register 106 is deasserted. It should be noted that because the transmission register 106 is deasserted, the sensor does not start a counting operation by the timer portion 107.

In Step S802, the air conditioner receives the packet P3. Herein, because the reception setting register 105 is deasserted, the air conditioner does not start a counting operation by the timer portion 107.

As has been described, with the communication device according to the first embodiment of the invention, by merely asserting or deasserting the reception setting register 105 and the transmission setting register 106, high-speed communications are enabled while reducing power consumption of the apparatus 1 that operates intermittently without the need to manage the setting and the state of the apparatus 1 at the other end by the functional portion 1001 and the terminal control portion 1002 in the apparatus 1 each time a message is transmitted or received.

In other words, the characteristic of the communication device 11 as the first embodiment of the invention is that operations are completed within the communication device 11 and between the communication devices 11 and no special controls by the functional portion 1001 and the terminal control portion 1002 in the apparatus 1 are required except that two registers are set from the outside. Also, when the communication device in the related art is newly replaced by the communication device as the first embodiment of the invention in the apparatus 1, the processing method in the related can be employed intact by merely setting the reception setting register 105 and the transmission setting register 106 at the initialization of the apparatus 1 or the initialization of the network system without having to change the processing thereafter.

In the embodiment above, the apparatus 1 that performs an intermittent reception operation operates continuously for a specific time according to the continuous operation request, and power consumption during this time is increased. It is therefore preferable to adjust the continuous operation request effective time by balancing power consumption and a communication time needed for the communication sequence.

In the embodiment above, the continuous operation request effective time is the value held fixedly in the timer portion 107. However, it may be adjusted flexibly to match with the configuration of the network system. In this case, it may be configured in such a manner that the transmission interface portion 112 receives a command to change the continuous operation request effective time from the outside, and the transmission control portion 104 changes the continuous operation request effective time by decoding this command. In this instance, it is preferable that the same time is set in all the communication devices forming the network system as the continuous operation request effective time.

In this embodiment, the packets P1 through P4 have the data structures shown in FIGS. 3A through 3D, respectively. The invention, however, is not limited to this configuration, and other structures, for example, the one including an error detection code, may be adopted. Also, a broadcast request from the transmission interface portion 112 to the transmission control portion 104 may be specified by a request code used specifically for broadcast or a control signal different from the packet instead of being specified by the broadcast address.

Further, each of the reception setting register 105 and the transmission setting register 106 is a 1-bit register. The invention, however, is not limited to this configuration, and any means that can be set to enabled and disabled states is available, or the states of being asserted and deasserted may be defined inversely. For example, it may be configured in such a manner that a continuous reception operation is performed when the reception setting register 105 is asserted, while an intermittent reception operation is performed when the reception setting register 105 is deasserted. Further, a physical switch may be provided instead of the reception setting register 105, so that it is switched appropriately when outfitted to the apparatus 1.

Further, when the controller checks the network system to set the transmission setting register 106, a communication sequence may possibly become redundant by asserting the transmission setting register 106. However, the controller becomes able to communicate with all the apparatuses 1 on the network system. Further, the state of the network system may be acquired by a method other than radio communications with the use of cable communications, manual settings, etc.

Further, when part of the processing by the transmission processing portion 104 is made different while maintaining the same configuration as the communication device 11 of this embodiment, the same advantages of the invention can be achieved. In other words, in Processing 4 set forth in Table 1 above, the packet P3 in which is not set the continuous operation request flag in the control code is generated. The invention, however, is not limited to this configuration, and the packet P3 in which is set the continuous operation request flag may be generated. In a case where the continuous operation request flag is set, the continuous operation request effective time is extended in the apparatus 1 that performs an intermittent reception operation when the packet P3 by Processing 4 is received within the continuous operation request effective time. By exploiting this configuration, high-speed communications are enabled in the network system in which a sequence of incoming and outgoing simplex transmissions is continued over a long period.

Further, in Processing 5 set forth in Table 1, the packet in which is set the continuous operation request flag in the control code is generated. The invention, however, is not limited to this configuration, and the packet P3 in which is not set the continuous operation request flat in the control code may be generated. In a case where the continuous operation request flag is not set, the apparatus 1 that performs an intermittent reception operation does not shift to the continuous reception mode when it receives the packet P3 outside the continuous operation request effective time. It is thus possible to reduce power consumption.

This is effective in a network system in which the packet P3 will not reciprocate repetitively when the controller controls the apparatus 1 that performs an intermittent reception operation independently.

Further, Processing 5 changed as described above and Processing 4 changed as described above may be combined to match with the characteristic of the communication sequence used in the network system.

Furthermore, in this embodiment, the control code including the continuous operation request flag is transmitted together with a message in the form of a packet. The invention, however, is not limited to this configuration. A continuous operation request packet (continuous operation request signal) requesting to continue the operation in a reception enabled state within the continuous operation request effective time since the reception may be transmitted independently to the apparatus 1 that performs an intermittent reception operation, immediately followed by transmission of the packet including the message.

Second Embodiment

Figure 10:
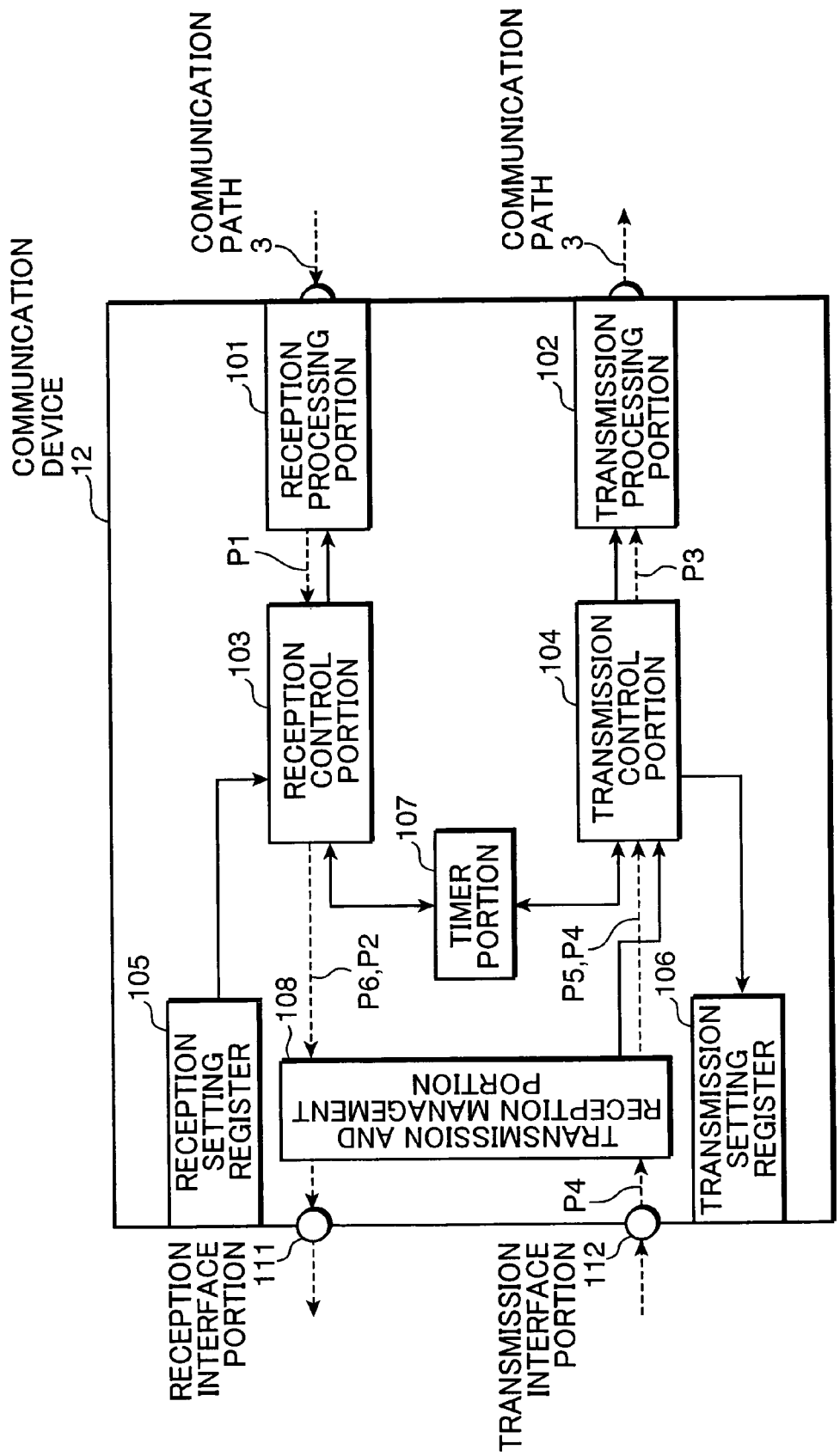
FIG. 10 is a block diagram showing the configuration of a communication device according to a second embodiment of the invention.

FIG. 10 is a block diagram showing the configuration of the communication device according to a second embodiment of the invention. As is shown in FIG. 10, a communication device 12 is of almost the same configuration as the communication device 11 of the first embodiment. However, it is different from the communication device 11 of the first embodiment only in that a transmission and reception management portion 108 is additionally provided.

The transmission and reception management portion 108 is connected between the reception control portion 103 and the reception interface portion 111 and between the transmission interface portion 112 and the transmission control portion 104. The transmission and reception management portion 108 generates and delivers an ACK request packet P5 to the transmission control portion 104. The ACK request packet P5 is a packet requesting the transmission control portion 104 to generate the packet P3 in which information indicating ACK is set in the control code and to deliver the packet P3 to the transmission processing portion 102.

Also, the transmission and reception management portion 108 is furnished with a function of saving the transmission destination logical address included in the packet P4 when the packet P4 is delivered from the transmission interface portion 112 and starting a counting operation by means of an internal timer while generating and delivering the ACK request packet P5 to the transmission control portion 104. Further, the transmission and reception management portion 108 is furnished with a function of outputting a re-transmission instruction to the transmission control portion 104 at the occurrence of a timeout when the internal timer has counted a specific time.

Figure 3E:
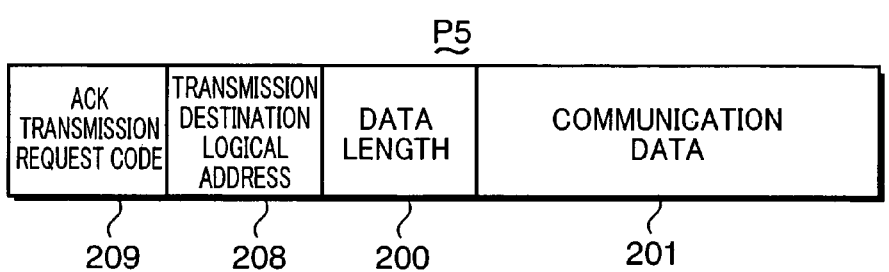

FIG. 3E is a view showing the data structure of the ACK request packet P5. As is shown in FIG. 3E, the ACK request packet P5 includes an ACK transmission request code portion 209, a transmission destination logical address portion 208, a data length portion 200, and a communication data portion 201. The ACK transmission request code portion 209 stores an ACK request code, which is a code indicating that the type of the packet is the ACK request packet P5. The transmission destination logical address portion 208, the data length portion 200, and the communication data portion 201 store the transmission destination logical address, the data length, and communication data, respectively, as in the packet P4.

Besides the functions furnished in the first embodiment of the invention, the transmission control portion 104 is furnished with a function of holding the transmitted packet P3 and delivering the packet P3 to the transmission processing portion 102 for the packet P3 held therein to be repetitively transmitted upon receipt of a re-transmission instruction from the transmission and reception management portion 108. The transmission control portion 104 is also furnished with a function of decoding the ACK request packet P5 delivered from the transmission and reception management portion 108 to generate the packet P3 in which the ACK flag is set in the control code when an ACK flag is stored in the control code portion 204, and delivering the packet P3 to the transmission processing portion 102. Herein, a message stored in the communication data portion 201 in the packet P3 in which is set information indicating ACK in the control code is meaningless.

Besides the functions furnished in the first embodiment of the invention, the reception control portion 103 decodes the packet P1 received from the reception processing portion 101 to generate an ACK reception notifying packet (reception notifying message) P6 when the ACK flag is stored in the control code portion 204 in the packet P1, and delivers the packet P6 to the transmission and reception management portion 108.

Figure 3F:
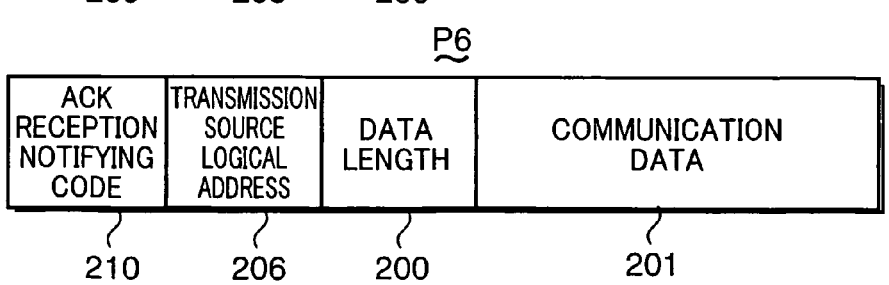

FIG. 3F is a view showing the data structure of an ACK reception notifying packet P6. As is shown in FIG. 3F, the ACK reception notifying packet P6 includes an ACK reception notifying code portion 210, a transmission source logical address portion 206, a data length portion 200, and a communication data portion 201.

The ACK reception notifying code portion 210 stores an ACK reception notifying code made of a code indicating that the type of the packet is the ACK reception notifying packet P6. The transmission source logical address portion 206, the data length portion 200, and the communication data portion 201 respectively store the same data stored in the transmission source logical address portion 206, the data length portion 200, and the communication data portion 201 shown in the packet P2. A message stored in the communication data portion 201 in the ACK reception notifying packet P6 is meaningless.

Further, when the packet P2 other than the ACK reception notifying packet P6 received by a simplex transmission is delivered from the reception control portion 103, the transmission and reception management portion 108 delivers the packet P2 to the reception interface portion 111, and at the same time it decodes the transmission source logical address stored in the transmission source logical address portion 206 in the packet P2 to generate the ACK request packet P5 in which the decoded address is stored in the transmission destination logical address portion 208, after which it delivers the packet P5 to the transmission control portion 104.

Further, when the packet P2 received by a broadcast transmission is delivered from the reception control portion 103, the transmission and reception management portion 108 merely performs processing by which the packet P2 is delivered to the reception interface portion 111. Further, when the ACK reception notifying packet P6 received by a simplex transmission is delivered from the reception control portion 103, the transmission and reception management portion 108 decodes the transmission source logical address and discards the ACK reception notifying packet P6. When the transmission source logical address stored in the ACK reception notifying packet P6 to be discarded coincides with the transmission destination logical address held therein, the transmission and reception management portion 108 resets and stops the counting by the timer portion 107.

For a radio communication system on which at least one controller apparatus that operates continuously is present, by applying the communication device 12 configured as described above to all the apparatuses 1 in the radio communication system in achieving the control on the system mainly by communications between the controller apparatus and the respective terminals it is possible to confirm a success of communications in layers of radio communications in addition to the same advantages as the first embodiment of the invention.

When the ACK packet is not returned, it is possible to transmit a signal that can be received by all the apparatuses 1 including the apparatus 1 that performs an intermittent reception operation again upon judgment that communications failed. It is thus possible to increase the reliability of radio communications.

In the communication device 12 of the second embodiment, the ACK packet is a packet having an ACK flag in the control code shown in FIG. 3A. However, it can be a packet of a configuration other than this configuration. For example, simple communication data may be defined as an ACK message, so that a packet having the communication data combined with a normal control code can be used. Also, the ACK transmission request packet and the ACK reception notifying packet used among the transmission and reception management portion 108, the reception control portion 103, and the transmission control portion 104 include the ACK transmission request code portion 209 and the ACK reception notifying code portion 210. However, any method is available as long as the transmission and reception of the ACK packet can be specified. For example, it is possible to use a method for specifying transmission and reception using a control signal different from a packet.

In the description above, the transmission and reception management portion 108 performs processing by which the packet P2 is delivered to the reception interface portion 111 when the packet P2 received by a broadcast transmission is delivered from the reception control portion 103. The invention, however, is not limited to this configuration, and the ACK packet for the packet P2 received by a broadcast transmission may be generated in addition to this processing, and delivered to the transmission control portion 104.

Third Embodiment

A third embodiment of the communication device of the invention will now be described. FIG. 11 is the block diagram showing the configuration of a communication device 13 according to the third embodiment. Components having the same configuration as the first embodiment are labeled with the same reference numerals, and the descriptions of such components are omitted in the third embodiment.

The communication device 13 according to the third embodiment is applied to the controller. N (N is an integer) apparatuses 1 are connected to this controller via the communication paths 3. The communication device 13 is characterized by including N timer portions 107 to correspond to the respective N apparatuses 1. Each timer portion 107 counts the continuous operation request effective time of the corresponding apparatus 1 under the control of the reception control portion 103 and the transmission control portion 104.

When this configuration is adopted, for example, it is possible to count the continuous operation request effective time of a given apparatus 1 that performs an intermittent reception independently while the controller is counting the continuous operation request effective time of another apparatus 1 that performs an intermittent reception. Satisfactory communications are thus enabled also in a network system in which communication sequences converge.

The invention can be summarized as follows.

(1) A communication device of the invention is a communication device applied to each apparatus forming a network system that includes at least one intermittent apparatus, characterized by including: transmission processing means for transmitting various kinds of data; timer means for counting a continuous operation request effective time during which transmitted data is always received; transmission control means for controlling the transmission processing means to transmit data in which is set continuous operation request information causing the timer means in a communication device applied to the intermittent apparatus that receives data intermittently to start counting the continuous operation request effective time, and for starting its own timer means to count the continuous operation request effective time; reception processing means for receiving various kinds of data; and reception control means for controlling the reception processing means, wherein the reception control means in the communication device applied to the intermittent apparatus starts its own timer means to count the continuous operation request effective time upon receipt of the data in which is set the continuous operation request information at its own reception processing means.

According to this configuration, high-speed data communications are enabled at high efficiency while achieving power saving in the communication device that operates intermittently.

(2) Also, in the configuration as above, it is preferable that the communication device further includes: transmission interface means for accepting transmission destination information specifying whether data is to be transmitted by a broadcast or simplex transmission from an apparatus main body and delivering the transmission destination information to the transmission control means; and transmission setting holding means for holding transmission setting information that is enabled or disabled from an outside, wherein the transmission control means determines transmission control processing, in which presence or absence of the continuous operation request information and the number of transmissions of data are specified in advance, depending on the transmission destination information, the transmission setting information, and whether the timer means is counting the continuous operation request effective time, and transmits data generated according to the determined transmission control processing to the transmission means.

According to this configuration, by merely allowing the transmission setting holding means to hold the enabled or disabled transmission setting information and delivering the transmission destination information specifying whether data is to be transmitted by a broadcast or simplex transmission to the transmission control means from the apparatus main body via the interface means, not only is it possible to transmit data in which the continuous operation request information is set appropriately, but it is also possible to transmit the data an adequate number of times.

(3) It is preferable that in a case where the transmission destination information specifies a broadcast transmission, the transmission setting information specifies a state of having been enabled, and the timer means is within the continuous operation request effective time, the transmission control means performs the transmission control processing by which the continuous operation request information is set in data and the data is transmitted once.

According to this configuration, by setting a broadcast transmission in the transmission destination information and enabling the transmission setting information, data in which is set the continuous operation request information is transmitted once while the timer means is within the continuous operation request effective time.

(4) It is preferable that in a case where the transmission destination information specifies a broadcast transmission, the transmission setting information specifies a state of having been enabled, and the timer means is outside the continuous operation request effective time, the transmission control means performs the transmission control processing by which the continuous operation request information is set in data and the data is transmitted repetitively over a period longer than the intermittent cycle.

According to this configuration, by setting a broadcast transmission in the transmission destination information and enabling the transmission setting information, the data in which is set the continuous operation request information is transmitted repetitively over a period longer than the intermittent cycle while the timer means is outside the continuous operation request effective time. The communication device that operates intermittently is thus able to receive the data in which the continuous operation request information is set in a reliable manner.

(5) It is preferable that in a case where the transmission destination information specifies a broadcast transmission and the transmission setting information specifies a state of having been disabled, the transmission control means performs the transmission control processing by which the continuous operation request information is set in data and the data is transmitted once.

According to this configuration, by setting a broadcast transmission in the transmission destination information and disabling the transmission setting information, the data in which is set the continuous operation request information is transmitted once regardless of the continuous operation request effective time.

(6) It is preferable that in a case where the transmission destination information specifies a simplex transmission, the transmission setting information specifies a state of having been enabled, and the timer means is within the continuous operation request effective time, the transmission control means is characterized by performing the transmission control processing by which the continuous operation request information is not set in data and the data is transmitted once.

According to this configuration, by setting a simplex transmission in the transmission destination information and enabling the transmission setting information, the data in which is not set the continuous operation request is transmitted once while the timer means is within the continuous operation request effective time. It is thus possible to prevent the continuous operation request effective time from being extended when a particular communication device that operates intermittently is within the continuous operation request effective time.

(7) It is preferable that in a case where the transmission destination information specifies a simplex transmission, the transmission setting information specifies a state of having been enabled, and the timer means is within the continuous operation request effective time, the transmission control means performs the transmission control processing by which the continuous operation request information is set in data and the data is transmitted once.

According to this configuration, by setting a simplex transmission in the transmission destination information and enabling the transmission setting information, the data in which is set the continuous operation request information is transmitted once while the timer means is within the continuous operation request effective time. It is thus possible to extend the continuous operation request effective time of the communication device that operates intermittently. Also, because the communication device that operates intermittently is within the continuous operation request effective time, even when the data in which is set the continuous operation request information is not transmitted repetitively, the communication device is able to receiver this data when the data is transmitted once. In the invention, because the data is transmitted only once, efficiency of the communications is improved.

(8) It is preferable that in a case where the transmission destination information specifies a simplex transmission, the transmission setting information specifies a state of having been enabled, and the timer means is outside the continuous operation request effective time, the transmission control means performs the transmission control processing by which the continuous operation request information is set in data and the data is transmitted repetitively over a period longer than the intermittent cycle.

According to this configuration, by setting a simplex transmission in the transmission destination information and enabling the transmission setting information, the data in which is set the continuous operation request information is transmitted repetitively over a period longer than the intermittent cycle of the communication device that operates intermittently while the timer means is outside the continuous operation request effective time. It is thus possible to shift the communication device that operates intermittently in the reception suspended state to the continuous reception state in a reliable manner.

(9) It is preferable that in a case where the transmission destination information specifies a simplex transmission, the transmission setting information specifies a state of having been enabled, and the timer means is outside the continuous operation request effective time, the transmission control means performs the transmission control processing by which the continuous operation request information is not set in data and the data is transmitted repetitively over a period longer than the intermittent cycle.

According to this configuration, by setting a simplex transmission in the transmission destination information and enabling the transmission setting information, the data in which is not set the continuous operation request information is transmitted repetitively over a period longer than the intermittent cycle while the timer means is outside the continuous operation request effective time. The communication device that operates intermittently in the reception suspended state is thus maintained in the reception suspended state, which makes it possible to achieve power saving in this device.

(10) It is preferable that in a case where the transmission destination information specifies a simplex transmission and the transmission setting information specifies a state of having been disabled, the transmission control means performs the transmission control processing by which the continuous operation request information is not set in data and the data is transmitted once.

According to this configuration, by setting a simplex transmission in the transmission destination information and disabling the transmission setting information, the data in which is set the continuous operation request information is transmitted once regardless whether the timer means is within the continuous operation request effective time.

(11) It is preferable that the communication device further includes reception setting holding means for holding reception setting information specifying whether data is received continuously or data is received intermittently by the reception means, and that in a case where the reception setting information specifies a continuous reception, the reception control means controls the reception means to receive the data continuously, and in a case where the reception setting information specifies an intermittent reception, the reception control means controls the reception means to receive the data intermittently.

According to this configuration, it is possible to attach a common communication device to each apparatus without the need to change the configuration of the communication device from apparatus to apparatus.

(12) It is preferable that the network system is constructed from one controller that is an apparatus performing a continuous reception, and plural apparatuses other than the controller, and that plural timer means are present in the communication device applied to the controller.

According to this configuration, because the controller is provided with plural timer means, the continuous operation request effective time can be counted individually for each apparatus. It is thus possible to control each apparatus independently as to whether the apparatus should be brought into the continuous reception state. In this case, plural timer means may be fixedly allocated to respective apparatuses, for example, by allocating the timer means for an air conditioner to the air conditioner and the timer means for a sensor to the sensor. Alternatively, timer means may be allocated dynamically to the respective apparatuses, for example, when the continuous operation request effective time needs to be counted for a given apparatus, any timer means that is not currently performing a counting operation is controlled to count the continuous operation request effective time of this apparatus. Further, for example, two timer means may be provided, so that the counting is performed for the two apparatuses that made communications recently.

(13) It is preferable that in a case where the transmission destination information specifies a broadcast transmission, the transmission setting information specifies a state of having been enabled, and all the timer means are within the continuous operation request effective time, the transmission control means performs the transmission control processing by which the continuous operation request information is set in data and the data is transmitted once or transmitted repetitively.

According to this configuration, by setting a broadcast transmission in the transmission destination information and enabling the transmission setting information, the data in which is set the continuous operation request information is transmitted once or repetitively when all the timer means are within the continuous operation request effective time. It is thus possible to extend the continuous operation request effective time in all the communication devices that operate intermittently on the network at a time. When the timer means are allocated fixedly, it is preferable to transmit the data in which is set the continuous operation request information once. When the timer means are allocated dynamically, it is preferable to transmit the data in which is set the continuous operation request information repetitively.

(14) It is preferable that in a case where the transmission destination information specifies a broadcast transmission, the transmission setting information specifies a state of having been enabled, and at least one timer means is outside the continuous operation request effective time, the transmission control means performs the transmission control processing by which the continuous operation request information is set in data and the data is transmitted repetitively over a period longer than an intermittent cycle.

According to this configuration, by setting a broadcast transmission in the transmission destination information and enabling the transmission setting information, the data in which is set the continuous operation request information is transmitted repetitively over a period longer than the intermittent cycle when at least one timer means is outside the continuous operation request effective time. It is thus possible to shift all the communication devices that operate intermittently to the continuous reception state at a time.

(15) It is preferable that in a case where the transmission destination information specifies a broadcast transmission and the transmission setting information specifies a state of having been disabled, the transmission control means performs the transmission control processing by which the continuous operation request information is set in data and the data is transmitted once.

According to this configuration, by setting a broadcast transmission in the transmission destination information and disabling the transmission setting information, the data in which is set the continuous operation request information is transmitted once regardless whether the timer means is within the continuous operation request effective time.

(16) It is preferable that in a case where the transmission destination information specifies a simplex transmission, the transmission setting information specifies a state of having been enabled, and the timer means correlated with a transmission destination is within the continuous operation request effective time, the transmission control means performs the transmission control processing by which the continuous operation request information is not set in data and the data is transmitted once.

According to this configuration, by setting a simplex transmission in the transmission destination information and enabling the transmission setting information, the data is transmitted once without setting the continuous operation request information while the timer means corresponding to the communication device at the transmission destination is within the continuous operation request effective time. It is thus possible to prevent the continuous operation request effective time from being extended when a particular communication device that operates intermittently is within the continuous operation request effective time.

(17) It is preferable that in a case where the transmission destination information specifies a simplex transmission, the transmission setting information specifies a state of having been enabled, and the timer means correlated with a transmission destination is within the continuous operation request effective time, the transmission control means performs the transmission control processing by which the continuous operation request information is set in data and the data is transmitted once.

According to this configuration, by setting a simplex transmission in the transmission destination information and enabling the transmission setting information, the data in which is set the continuous operation request information is transmitted once while the timer means is within the continuous operation request effective time. It is thus possible to extend the continuous operation request effective time of the communication device that operates intermittently. Also, because the communication device that operates intermittently is within the continuous operation request effective time, even when the data in which is set the continuous operation request information is not transmitted repetitively, the communication device is able to receive this data when the data is transmitted once. In the invention, because the data is transmitted only once, the efficiency of communications is improved.

(18) It is preferable that in a case where the transmission destination information specifies a simplex transmission, the transmission setting information specifies a state of having been enabled, and the timer means correlated with a transmission destination is outside the continuous operation request effective time, the transmission control means performs the transmission control processing by which the continuous operation request information is set in data and the data is transmitted repetitively over a period longer than an intermittent cycle.

According to this configuration, by setting a simplex transmission in the transmission destination information and enabling the transmission setting information, the data in which is set the continuous operation request information is transmitted repetitively over a period longer than the intermittent cycle of the communication device that operates intermittently while the timer means corresponding to the communication device at the transmission destination is outside the continuous operation request effective time. It is thus possible to shift the communication device that operates intermittently in the reception suspended state to the continuous reception state in a reliable manner.

(19) It is preferable that in a case where the transmission destination information specifies a simplex transmission, the transmission setting information specifies a state of having been enabled, and the timer means correlated with a transmission destination is outside the continuous operation request effective time, the transmission control means performs the transmission control processing by which the continuous operation request information is not set in data and the data is transmitted repetitively over a period longer than an intermittent cycle.

According to this configuration, by setting a simplex transmission in the transmission destination information and enabling the transmission setting information, the data in which is not set the continuous operation request information is transmitted repetitively over a period longer than the intermittent cycle while the timer means is outside the continuous operation request effective time. The communication device that operates intermittently in the reception suspended state is thus maintained in the reception suspended state, which makes it possible to achieve power saving in this device.

(20) It is preferable that in a case where the transmission destination information specifies a simplex transmission and the transmission setting information specifies a state of having been disabled, the transmission control means performs the transmission control processing by which the continuous operation request information is not set in data and the data is transmitted once.

According to this configuration, by setting a simplex transmission in the transmission destination information and disabling the transmission setting information, the data in which is set the continuous operation request information is transmitted once regardless whether the timer means is within the continuous operation request effective time.

(21) It is preferable that the communication device further includes reception setting holding means for holding reception setting information specifying whether data is received continuously or data is received intermittently by the reception means, and that in a case where the reception setting information specifies a continuous reception, the reception control means controls the reception means to receive the data continuously, and in a case where the reception setting information specifies an intermittent reception, the reception control means controls the reception means to receive the data intermittently.

According to this configuration, for an apparatus other than the controller, it is possible to attach a common communication device to each apparatus without the need to change the configuration of the communication device from apparatus to apparatus.

(22) A communication device applied to each apparatus forming a network system, preferably including: transmission processing means for transmitting various kinds of data; timer means for counting a continued operation request effective time that is a time longer than an intermittent cycle of an intermittent reception and during which transmitted data is always received; transmission control means for controlling the transmission processing means to transmit a continuous operation request signal causing the timer means in a communication device applied to an intermittent apparatus that receives data intermittently to start counting the continuous operation request effective time, and for starting the timer means of its own to count the continuous operation request effective time; reception processing means for receiving various kinds of data; and reception control means for controlling the reception processing means, wherein the reception control means in the communication device applied to the intermittent apparatus starts its own timer means to count the continuous operation request effective time upon receipt of the continuous operation request signal at its own reception processing means.

According to this configuration, even when the continuous operation request signal for a specific use to specify the continuous operation request is transmitted instead of the configuration in (1) above in which the continuous operation request information is set in the data, high-speed data communications can be achieved at high efficiency while achieving power saving in the communication device that operates intermittently.

(23) It is preferable that the communication device further includes: transmission interface means for accepting transmission destination information specifying whether transmission data including a message to be transmitted is to be transmitted by a broadcast or simplex transmission from an apparatus main body and delivering the transmission destination information to the transmission control means; and transmission setting holding means for holding transmission setting information that is enabled or disabled from an outside, and that the transmission control means determines transmission control processing, in which the continuous operation request signal and the number of transmissions of the transmission data are specified in advance, depending on the transmission destination information, the transmission setting information, and whether the timer means is counting the continuous operation request effective time, and transmits data generated according to the determined transmission control processing to the transmission means.

According to this configuration, even when the continuous operation request signal is transmitted instead of setting the continuous operation request information, the same advantages as in (2) above can be achieved.

(24) It is preferable that in a case where the transmission destination information specifies a broadcast transmission, the transmission setting information specifies a state of having been enabled, and the timer means is within the continuous operation request effective time, the transmission control means performs the transmission control processing by which the continuous operation request signal is transmitted once and then the transmission data is transmitted once.

According to this configuration, even when the continuous operation request signal is transmitted instead of setting the continuous operation request information, the same advantages as in (3) above can be achieved.

(25) It is preferable that in a case where the transmission destination information specifies a broadcast transmission, the transmission setting information specifies a state of having been enabled, and the timer means is outside the continuous operation request effective time, the transmission control means performs the transmission control processing by which the continuous operation request signal is transmitted repetitively over a period longer than the intermittent cycle and then the transmission data is transmitted once.

According to this configuration, even when the continuous operation request signal is transmitted instead of setting the continuous operation request information, the same advantages as in (4) above can be achieved.

(26) It is preferable that in a case where the transmission destination information specifies a broadcast transmission and the transmission setting information specifies a state of having been disabled, the transmission control means performs the transmission control processing by which the continuous operation request signal is transmitted once and then the transmission data is transmitted once.

According to this configuration, even when the continuous operation request signal is transmitted instead of setting the continuous operation request information, the same advantages as in (5) above can be achieved.

(27) It is preferable that in a case where the transmission destination information specifies a simplex transmission, the transmission setting information specifies a state of having been enabled, and the timer means is within the continuous operation request effective time, the transmission control means performs the transmission control processing by which the transmission data is transmitted once.

According to this configuration, even when the continuous operation request signal is transmitted instead of setting the continuous operation request information, the same advantages as in (6) above can be achieved.

(28) It is preferable that in a case where the transmission destination information specifies a simplex transmission, the transmission setting information specifies a state of having been enabled, and the timer means is within the continuous operation request effective time, the transmission control means performs the transmission control processing by which the continuous operation request signal is transmitted once and then the transmission data is transmitted once.

According to this configuration, even when the continuous operation request signal is transmitted instead of setting the continuous operation request information, the same advantages as in (7) above can be achieved.

(29) It is preferable that in a case where the transmission destination information specifies a simplex transmission, the transmission setting information specifies a state of having been enabled, and the timer means is outside the continuous operation request effective time, the transmission control means performs the transmission control processing by which the continuous operation request signal is transmitted repetitively over a period longer than the intermittent cycle and then the transmission data is transmitted once.

According to this configuration, even when the continuous operation request signal is transmitted instead of setting the continuous operation request information, the same advantages as in (8) above can be achieved.

(30) It is preferable that in a case where the transmission destination information specifies a simplex transmission, the transmission setting information specifies a state of having been enabled, and the timer means is outside the continuous operation request effective time, the transmission control means performs the transmission control processing by which the transmission data is transmitted repetitively over a period longer than the intermittent cycle.

According to this configuration, even when the continuous operation request signal is transmitted instead of setting the continuous operation request information, the same advantages as in (9) above can be achieved.

(31) It is preferable that in a case where the transmission destination information specifies a simplex transmission and the transmission setting information specifies a state of having been disabled, the transmission control means performs the transmission control processing by which the transmission data is transmitted once.

According to this configuration, even when the continuous operation request signal is transmitted instead of setting the continuous operation request information, the same advantages as in (10) above can be achieved.

(32) It is preferable that the communication device further includes reception setting holding means for holding reception setting information specifying whether data is received continuously or data is received intermittently by the reception means, and that in a case where the reception setting information specifies a continuous reception, the reception control means controls the reception means to receive the data continuously, and in a case where the reception setting information specifies an intermittent reception, the reception control means controls the reception means to receive the data intermittently.

According to this configuration, even when the continuous operation request signal is transmitted instead of setting the continuous operation request information, the same advantages as in (11) above can be achieved.

(33) It is preferable that the network system is constructed from one controller and plural apparatuses other than the controller, and that plural timer means are present in the communication device applied to the controller.

According to this configuration, even when the continuous operation request signal is transmitted instead of setting the continuous operation request information, the same advantages as in (12) above can be achieved.

(34) It is preferable that in a case where the transmission destination information specifies a broadcast transmission, the transmission setting information specifies a state of having been enabled, and all the timer means are within the continuous operation request effective time, the transmission control means either performs the transmission control processing by which the continuous operation request signal is transmitted once and then the transmission data is transmitted once or performs the transmission control processing by which the continuous operation request signal is transmitted repetitively over a period longer than the intermittent cycle and then the transmission data is transmitted once.

According to this configuration, even when the continuous operation request signal is transmitted instead of setting the continuous operation request information, the same advantages as in (13) above can be achieved.

(35) It is preferable that in a case where the transmission destination information specifies a broadcast transmission, the transmission setting information specifies a state of having been enabled, and at least one timer means is outside the continuous operation request effective time, the transmission control means performs the transmission control processing by which the continuous operation request signal is transmitted repetitively over a period longer than the intermittent cycle and then the transmission data is transmitted once.

According to this configuration, even when the continuous operation request signal is transmitted instead of setting the continuous operation request information, the same advantages as in (14) above can be achieved.

(36) It is preferable that in a case where the transmission destination information specifies a broadcast transmission and the transmission setting information specifies a state of having been disabled, the transmission control means performs the transmission control processing by which the continuous operation request signal is transmitted once and then the transmission data is transmitted once.

According to this configuration, even when the continuous operation request signal is transmitted instead of setting the continuous operation request information, the same advantages as in (15) above can be achieved.

(37) It is preferable that in a case where the transmission destination information specifies a simplex transmission, the transmission setting information specifies a state of having been enabled, and the timer means correlated with a transmission destination is within the continuous operation request effective time, the transmission control means performs the transmission control processing by which the transmission data is transmitted once.

According to this configuration, even when the continuous operation request signal is transmitted instead of setting the continuous operation request information, the same advantages as in (16) above can be achieved.

(38) It is preferable that in a case where the transmission destination information specifies a simplex transmission, the transmission setting information specifies a state of having been enabled, and the timer means correlated with a transmission destination is within the continuous operation request effective time, the transmission control means performs the transmission control processing by which the continuous operation request signal is transmitted once and then the transmission data is transmitted once.

According to this configuration, even when the continuous operation request signal is transmitted instead of setting the continuous operation request information, the same advantages as in (17) above can be achieved.

(39) It is preferable that in a case where the transmission destination information specifies a simplex transmission, the transmission setting information specifies a state of having been enabled, and the timer means correlated with a transmission destination is outside the continuous operation request effective time, the transmission control means performs the transmission control processing by which the continuous operation request signal is transmitted by repeating a period longer than the intermittent cycle and then the transmission data is transmitted once.

According to this configuration, even when the continuous operation request signal is transmitted instead of setting the continuous operation request information, the same advantages as in (18) above can be achieved.

(40) It is preferable that in a case where the transmission destination information specifies a simplex transmission, the transmission setting information specifies a state of having been enabled, and the timer means correlated with a transmission destination is outside the continuous operation request effective time, the transmission control means performs the transmission control processing by which the transmission data is transmitted repetitively over a period longer than the intermittent cycle.

According to this configuration, even when the continuous operation request signal is transmitted instead of setting the continuous operation request information, the same advantages as in (19) above can be achieved.

(41) It is preferable that in a case where the transmission destination information specifies a simplex transmission and the transmission setting information specifies a state of having been disabled, the transmission control means performs the transmission control processing by which the transmission data is transmitted once.

According to this configuration, even when the continuous operation request signal is transmitted instead of setting the continuous operation request information, the same advantages as in (20) above can be achieved.

(42) It is preferable that the communication device further includes reception setting holding means for holding reception setting information specifying whether data is received continuously or data is received intermittently by the reception means, and that in a case where the reception setting information specifies a continuous reception, the reception control means controls the reception means to receive the data continuously, and in a case where the reception setting information specifies an intermittent reception, the reception control means controls the reception means to receive the data intermittently.

According to this configuration, even when the continuous operation request signal is transmitted instead of setting the continuous operation request information, the same advantages as in (21) above can be achieved.

(43) It is preferable that the communication device further includes transmission and reception management means for managing a sequence of a transmission and a reception, and that in a case where the transmission and reception management means is judged as failing in a simplex transmission while the transmission setting information is enabled, the transmission control means performs the transmission control processing by which the continuous operation request information is set in data and the data is transmitted again repetitively over a period longer than an intermittent reception cycle.

According to this configuration, it is possible to shift the communication device that operates intermittently to the continuous operation state in a more reliable manner.

(44) It is preferable that the communication device further includes transmission and reception management means for managing a sequence of a transmission and a reception, and that in a case where the transmission and reception management means is judged as failing in a simplex transmission while the transmission setting holding means is enabled, the transmission control means performs the transmission control processing by which the continuous operation request signal is transmitted repetitively over a period longer than an intermittent reception cycle and then the data is again transmitted once.

According to this configuration, it is possible to shift the communication device that operates intermittently to the continuous operation state in a more reliable manner.

(45) A communication method for a network system including a communication device that receives data intermittently, characterized in that a communication device at a transmission end includes a transmission control step of transmitting data in which is set continuous operation request information causing timer means in a communication device that performs an intermittent reception to start counting a continuous operation request effective time, and starting its own timer means to count the continuous operation request effective time, and that the communication device that performs the intermittent reception includes a reception control step of starting its own timer means to count the continuous operation request effective time upon receipt of the data in which the continuous operation request information is set.

According to this configuration, as in (1) above, high-speed data communications are enabled at high efficiency while achieving power saving.

(46) It is preferable that the transmission control step includes: a transmission setting reading step of reading out a transmission setting that is enabled or disabled; a timer starting step of starting the timer means to count the continuous operation request effective time; an appending step of appending the continuous operation request information to transmission data; a broadcast transmission step for an intermittent reception of transmitting the transmission data by a broadcast transmission over a period longer than an intermittent cycle assuming that the transmission data is received at another communication terminal that performs an intermittent reception operation; a broadcast transmission step for a continuous reception of transmitting the transmission data by a broadcast transmission over a period shorter than the intermittent cycle assuming that the transmission data is received at another communication terminal that performs a continuous reception operation; a simplex transmission step for an intermittent reception of transmitting the transmission data by a simplex transmission over a period longer than the intermittent cycle assuming that the transmission data is received at another communication terminal that performs an intermittent reception operation; and a simplex transmission step for a continuous reception of transmitting the transmission data by a simplex transmission over a period shorter than the intermittent cycle assuming that the transmission data is received at another communication terminal that performs a continuous reception operation.

(47) It is preferable that a communication device carrying out a broadcast transmission performs the appending step and the broadcast transmission step for an intermittent reception followed by the timer starting step in a case where the transmission setting read out in the transmission setting reading step is enabled and the timer means is outside the continuous operation request effective time, and the appending step and the broadcast transmission step for a continuous reception followed by the timer starting step in any other case.

According to this configuration, in a case where the transmission setting is enabled and the timer means is outside the continuous operation request effective time, the communication device carrying out a broadcast transmission transmits data in which is set the continuous operation request information repetitively over a period longer than the intermittent cycle. Meanwhile, in a case where the transmission setting is disabled or the timer means is outside the continuous operation request effective time, the communication device carrying out a broadcast transmission transmits data in which is set the continuous operation request information only once.

(48) It is preferable that a communication device carrying out a simplex transmission performs the appending step and the simplex transmission step for an intermittent reception followed by the timer starting step in a case where the transmission setting read out in the transmission setting reading step is enabled and the timer means is outside the continuous operation request effective time, and the simplex transmission step for a continuous reception in any other case.

According to this configuration, in a case where the transmission setting is enabled and the timer means is outside the continuous operation request effective time, the communication device carrying out a simplex transmission transmits data in which is set the continuous operation request information repetitively over a period longer than the intermittent cycle. Meanwhile, in a case where the transmission setting is enabled or the timer means is within the continuous operation request effective time, the communication device carrying out a simplex transmission transmits data in which is not set the continuous operation request information only once.

(49) It is preferable that a communication device carrying out a simplex transmission performs: the appending step and the simplex transmission step for a continuous reception followed by the timer starting step in a case where the transmission setting read out in the transmission setting reading step is enabled and the timer means is within the continuous operation request effective time; the appending step and the simplex transmission step for an intermittent reception followed by the timer starting step in a case where the transmission setting read out in the transmission setting reading step is enabled and the timer means is outside the continuous operation request effective time; and the simplex transmission step for a continuous reception in a case where the transmission setting read out in the transmission setting reading step is disabled.

According to this configuration, in a case where the transmission setting is enabled and the timer means is within the continuous operation request effective time, data in which is set the continuous operation request information is transmitted only once, and the continuous operation request effective time can be therefore extended.

(50) It is preferable that a communication device during a simplex transmission performs: the simplex transmission step for a continuous reception in a case where the transmission setting read out in the transmission setting reading step is enabled and the timer means is within the continuous operation request effective time; the simplex transmission step for an intermittent reception in a case where the transmission setting read out in the transmission setting reading step is enabled and the timer means is outside the continuous operation request effective time; and the simplex transmission step for a continuous reception in a case where the transmission setting read out in the transmission setting reading step is disabled.

According to this configuration, in a case where the transmission setting is enabled and the timer means is outside the continuous operation request effective time, data in which is not set the continuous operation request information is transmitted repetitively. It is thus possible to prevent a particular communication device from shifting to the continuous operation state, which enables power saving to be achieved.

(51) A communication method for a network system including a communication device that receives data intermittently, characterized in that a communication device at a transmission end includes a transmission control step of transmitting a continuous operation request signal causing timer means in a communication device that performs an intermittent reception to start counting a continuous operation request effective time, and starting its own timer means to count the continuous operation request effective time, and that the communication device that performs the intermittent reception includes a reception control step of starting its own timer means to count the continuous operation request effective time upon receipt of the continuous operation request signal.

According to this configuration, even when the continuous operation request signal is transmitted instead of transmitting data in which the continuous operation request information is set, the same advantages as in (45) above can be achieved.

(52) It is preferable that the transmission control step includes: a transmission setting reading step of reading out a state of a transmission setting that was enabled or disabled; a timer starting step of starting the timer means to count the continuous operation request effective time; a signal generating step of generating the continuous operation request signal; a broadcast transmission step for an intermittent reception of transmitting the continuous operation request signal by a broadcast transmission over a period longer than an intermittent cycle assuming that the continuous operation request signal is received at a communication device that performs an intermittent reception operation; a broadcast transmission step for a continuous reception of transmitting the continuous operation request signal by a broadcast transmission over a period shorter than the intermittent cycle assuming that the continuous operation request signal is received at another communication device that performs a continuous reception operation; a simplex transmission step for an intermittent reception of transmitting the continuous operation request signal by a simplex transmission over a period longer than the intermittent cycle assuming that the continuous operation request signal is received at another communication device that performs an intermittent reception operation; a broadcast transmission step for a continuous reception of transmitting the continuous operation request signal by a broadcast transmission over a period shorter than the intermittent cycle assuming that the continuous operation request signal is received at another communication device that performs a continuous reception operation; and a simplex transmission step for a continuous reception of transmitting the continuous operation request signal by a simplex transmission over a period shorter than the intermittent cycle assuming that the continuous operation request signal is received at another communication device that performs a continuous reception operation.

(53) It is preferable that a communication device during a broadcast transmission performs the signal generating step and the broadcast transmission step for an intermittent reception followed by the timer starting step in a case where the transmission setting read out in the transmission setting reading step is enabled and the timer means is outside the continuous operation request effective time, and the signal generating step and the broadcast transmission step for a continuous reception followed by the timer starting step in any other case.

According to this configuration, even when the continuous operation request signal is transmitted instead of transmitting data in which the continuous operation request information is set, the same advantages as in (47) above can be achieved.

(54) It is preferable that a communication device during a simplex transmission performs the signal generating step and the simplex transmission step for an intermittent reception followed by the timer starting step in a case where the transmission setting read out in the transmission setting reading step is enabled and the timer means is outside the continuous operation request effective time, and the simplex transmission step for a continuous reception in any other case.

According to this configuration, even when the continuous operation request signal is transmitted instead of transmitting data in which the continuous operation request information is set, the same advantages as in (48) above can be achieved.

(55) It is preferable that a communication device during a simplex transmission performs: the signal generating step and the simplex transmission step for a continuous reception followed by the timer starting step in a case where the transmission setting read out in the transmission setting reading step is enabled and the timer means is within the continuous operation request effective time; the signal generating step and the simplex transmission step for an intermittent reception followed by the timer starting step in a case where the transmission setting read out in the transmission setting reading step is enabled and the timer means is outside the continuous operation request effective time; and the simplex transmission step for a continuous reception in a case where the transmission setting read out in the transmission setting reading step is disabled.

According to this configuration, even when the continuous operation request signal is transmitted instead of transmitting data in which the continuous operation request information is set, the same advantages as in (49) above can be achieved.

(56) It is preferable that a communication device during a simplex transmission performs: the simplex transmission step for an intermittent reception in a case where the transmission setting read out in the transmission setting reading step is enabled and the timer means is within the continuous operation request effective time; the simplex transmission step for an intermittent reception in a case where the transmission setting read out in the transmission setting reading step is enabled and the timer means is outside the continuous operation request effective time; and the simplex transmission step for a continuous reception in a case where the transmission setting read out in the transmission setting reading step is disabled.

According to this configuration, even when the continuous operation request signal is transmitted instead of transmitting data in which the continuous operation request information is set, the same advantages as in (50) above can be achieved.

(57) It is preferable that the communication method further includes a reception notifying transmission step of transmitting a reception notifying message to a transmission source for a reception of a simplex transmission; and a step of judging whether the simplex transmission succeeded, and that a communication device at a reception end performs the reception notifying transmission step at least upon receipt of the simplex transmission, and the communication device at the transmission end performs the appending step, the simplex transmission step for an intermittent reception, and the timer starting step in a case where the simplex transmission is judged as failing while the transmission setting is enabled.

According to this configuration, the same advantages as in (43) above can be achieved.

(58) It is preferable that the communication method further includes: a reception notifying transmission step of transmitting a reception notifying message to a transmission source for a reception of a simplex transmission; and a step of judging whether the simplex transmission succeeded, and that a communication device at a reception end performs the reception notifying transmission step at least upon receipt of the simplex transmission, and the communication device at the transmission end performs the signal generation step, the simplex transmission step for an intermittent reception, and the timer starting step in a case where transmission and reception management means is judged as failing in the simplex transmission while and the transmission setting is enabled.

According to this configuration, the same advantages as in (44) above can be achieved.

(59) It is preferable that a counting by the timer means, a start of the counting, and the judgment are performed independently for each communication device.

According to this configuration, the same advantages as in (12) above can be achieved.

The communication device and the communication method of the invention are furnished with a function of shifting to a continuous reception operation for a specific time during an intermittent reception operation, and are therefore useful as a communication device used in an apparatus furnished with a function of performing an intermittent reception and a communication method used in an irregular intermittent reception communication system having no controller that regularly transmits a control signal.

The invention claimed is:

1. A communication device applied to each apparatus forming a network system comprising:
   transmission processing means for transmitting data;
   timer means for counting a continuous operation request effective time during which transmitted data is always received;
   transmission control means for controlling the transmission processing means to transmit data in which is set continuous operation request information causing the timer means in a communication device applied to an intermittent apparatus that receives data intermittently to start counting the continuous operation request effective time, and for starting its own timer means to count the continuous operation request effective time;
   reception processing means for receiving data;
   reception control means for controlling the reception processing means;
   transmission interface means for accepting transmission destination information specifying whether data is to be transmitted by a broadcast or simplex transmission from an apparatus main body and for delivering the transmission destination information to the transmission control means; and
   transmission setting holding means for holding transmission setting information that is enabled or disabled,
   wherein the reception control means in the communication device applied to the intermittent apparatus starts its own timer means to count the continuous operation request effective time upon receipt of the data in which is set the continuous operation request information at its own reception processing means, and
   wherein the transmission control means determines transmission control processing, in which presence or absence of the continuous operation request information and a number of transmissions of data are specified in advance, depending on the transmission destination information, the transmission setting information, and whether the timer means is counting the continuous operation request effective time, and transmits data generated according to the determined transmission control processing to the transmission processing means.

2. The communication device according to claim 1, wherein:
   in a case where the transmission destination information specifies a broadcast transmission, the transmission setting information specifies a state of having been enabled, and in a case where the timer means is within the continuous operation request effective time, the transmission control means performs the transmission control processing by which the continuous operation request information is set in the data and the data is transmitted once.

3. The communication device according to claim 1, wherein:
   in a case where the transmission destination information specifies a broadcast transmission, the transmission setting information specifies a state of having been enabled, and in a case where the timer means is outside the continuous operation request effective time, the transmission control means performs the transmission control processing by which the continuous operation request information is set in the data and the data is transmitted repetitively over a period longer than an intermittent cycle.

4. The communication device according to claim 1, wherein:
   in a case where the transmission destination information specifies a broadcast transmission and the transmission setting information specifies a state of having been disabled, the transmission control means performs the transmission control processing by which the continuous operation request information is set in the data and the data is transmitted once.

5. The communication device according to claim 1, wherein:
   in a case where the transmission destination information specifies a simplex transmission, the transmission setting information specifies a state of having been enabled, and in a case where the timer means is within the continuous operation request effective time, the transmission control means performs the transmission control processing by which the continuous operation request information is not set in the data and the data is transmitted once.

6. The communication device according to claim 1, wherein:
   in a case where the transmission destination information specifies a simplex transmission, the transmission setting information specifies a state of having been enabled, and in a case where the timer means is within the continuous operation request effective time, the transmission control means performs the transmission control processing by which the continuous operation request information is set in the data and the data is transmitted once.

7. The communication device according to claim 1, wherein:
   in a case where the transmission destination information specifies a simplex transmission, the transmission setting information specifies a state of having been enabled, and in a case where the timer means is outside the continuous operation request effective time, the transmission control means performs the transmission control processing by which the continuous operation request information is set in the data and the data is transmitted repetitively over a period longer than an intermittent cycle.

8. The communication device according to claim 1, wherein:
   in a case where the transmission destination information specifies a simplex transmission, the transmission setting information specifies a state of having been enabled, and in a case where the timer means is outside the continuous operation request effective time, the transmission control means performs the transmission control processing by which the continuous operation request information is not set in the data and the data is transmitted repetitively over a period longer than an intermittent cycle.

9. The communication device according to claim 1, wherein:
in a case where the transmission destination information specifies a simplex transmission and the transmission setting information specifies a state of having been disabled, the transmission control means performs the transmission control processing by which the continuous operation request information is not set in the data and the data is transmitted once.

10. The communication device according to claim 1, further comprising:
reception setting holding means for holding reception setting information specifying whether data is received continuously or data is received intermittently by the reception means;
wherein in a case where the timer means is counting the continuous operation request effective time or the reception setting information specifies a continuous reception, the reception control means controls the reception means to receive the data continuously, and in a case where the timer means is not counting the continuous operation request effective time and the reception setting information specifies an intermittent reception, the reception control means controls the reception means to receive the data intermittently.

11. The communication device according to claim 1, wherein:
the network system is constructed from one controller, and plural apparatuses other than the controller;
plural timer means are present in the communication device applied to the controller; and
in a case where the transmission destination information specifies a broadcast transmission, the transmission setting information specifies a state of having been enabled, and in a case where all the timer means are within the continuous operation request effective time, the transmission control means performs the transmission control processing by which the continuous operation request information is set in the data and the data is transmitted once or transmitted repetitively.

12. The communication device according to claim 11, wherein:
in a case where the transmission destination information specifies a broadcast transmission, the transmission setting information specifies a state of having been enabled, and in a case where at least one timer means is outside the continuous operation request effective time, the transmission control means performs the transmission control processing by which the continuous operation request information is set in the data and the data is transmitted repetitively over a period longer than an intermittent cycle.

13. The communication device according to claim 11, wherein:
in a case where the transmission destination information specifies a broadcast transmission and the transmission setting information specifies a state of having been disabled, the transmission control means performs the transmission control processing by which the continuous operation request information is set in the data and the data is transmitted once.

14. The communication device according to claim 11, wherein:
in a case where the transmission destination information specifies a simplex transmission, the transmission setting information specifies a state of having been enabled, and in a case where the timer means correlated with a transmission destination is within the continuous operation request effective time, the transmission control means performs the transmission control processing by which the continuous operation request information is not set in the data and the data is transmitted once.

15. The communication device according to claim 11, wherein:
in a case where the transmission destination information specifies a simplex transmission, the transmission setting information specifies a state of having been enabled, and in a case where the timer means correlated with a transmission destination is within the continuous operation request effective time, the transmission control means performs the transmission control processing by which the continuous operation request information is set in the data and the data is transmitted once.

16. The communication device according to claim 11, wherein:
in a case where the transmission destination information specifies a simplex transmission, the transmission setting information specifies a state of having been enabled, and in a case where the timer means correlated with a transmission destination is outside the continuous operation request effective time, the transmission control means performs the transmission control processing by which the continuous operation request information is set in the data and the data is transmitted repetitively over a period longer than an intermittent cycle.

17. The communication device according to claim 11, wherein:
in a case where the transmission destination information specifies a simplex transmission, the transmission setting information specifies a state of having been enabled, and in a case where the timer means correlated with a transmission destination is outside the continuous operation request effective time, the transmission control means performs the transmission control processing by which the continuous operation request information is not set in the data and the data is transmitted repetitively over a period longer than an intermittent cycle.

18. The communication device according to claim 11, wherein:
in a case where the transmission destination information specifies a simplex transmission and the transmission setting information specifies a state of having been disabled, the transmission control means performs the transmission control processing by which the continuous operation request information is not set in the data and the data is transmitted once.

19. The communication device according to claim 11, further comprising:
reception setting holding means for holding reception setting information specifying whether data is received continuously or data is received intermittently by the reception means,
wherein in a case where the timer means is counting the continuous operation request effective time or the reception setting information specifies a continuous reception, the reception control means controls the reception means to receive the data continuously, and in a case where the timer means is not counting the continuous operation request effective time and the reception setting information specifies an intermittent reception, the reception control means controls the reception means to receive the data intermittently.

20. A communication device applied to each apparatus forming a network system comprising:

transmission processing means for transmitting data;
timer means for counting a continuous operation request effective time during which transmitted data is always received;
transmission control means for controlling the transmission processing means to transmit a continuous operation request signal causing the timer means in a communication device applied to an intermittent apparatus that receives data intermittently to start counting the continuous operation request effective time, and for starting its own timer means to count the continuous operation request effective time;
reception processing means for receiving data;
reception control means for controlling the reception processing means;
transmission interface means for accepting transmission destination information specifying whether transmission data including a message to be transmitted is to be transmitted by a broadcast or simplex transmission from an apparatus main body and for delivering the transmission destination information to the transmission control means; and
transmission setting holding means for holding transmission setting information that is enabled or disabled,
wherein the reception control means in the communication device applied to the intermittent apparatus starts its own timer means to count the continuous operation request effective time upon receipt of the continuous operation request signal at its own reception processing means, and
wherein the transmission control means determines transmission control processing, in which the continuous operation request signal and a number of transmissions of the transmission data are specified in advance, depending on the transmission destination information, the transmission setting information, and whether the timer means is counting the continuous operation request effective time, and transmits data generated according to the determined transmission control processing to the transmission processing means.

21. The communication device according to claim 20, wherein:
in a case where the transmission destination information specifies a broadcast transmission, the transmission setting information specifies a state of having been enabled, and in a case where the timer means is within the continuous operation request effective time, the transmission control means performs the transmission control processing by which the continuous operation request information is transmitted once and then the transmission data is transmitted once.

22. The communication device according to claim 20, wherein:
in a case where the transmission destination information specifies a broadcast transmission, the transmission setting information specifies a state of having been enabled, and in a case where the timer means is outside the continuous operation request effective time, the transmission control means performs the transmission control processing by which the continuous operation request signal is transmitted repetitively over a period longer thank an intermittent cycle and then the transmission data is transmitted once.

23. The communication device according to claim 20, wherein:
in a case where the transmission destination information specifies a broadcast transmission and the transmission setting information specifies a state of having been disabled, the transmission control means performs the transmission control processing by which the continuous operation request signal is transmitted once and then the transmission data is transmitted once.

24. The communication device according to claim 20, wherein:
in a case where the transmission destination information specifies a simplex transmission, the transmission setting information specifies a state of having been enabled, and in a case where the timer means is within the continuous operation request effective time, the transmission control means performs the transmission control processing by which the transmission data is transmitted once.

25. The communication device according to claim 20, wherein:
in a case where the transmission destination information specifies a simplex transmission, the transmission setting information specifies a state of having been enabled, and in a case where the timer means is within the continuous operation request effective time, the transmission control means performs the transmission control processing by which the continuous operation request signal is transmitted once and then the transmission data is transmitted once.

26. The communication device according to claim 20, wherein:
in a case where the transmission destination information specifies a simplex transmission, the transmission setting information specifies a state of having been enabled, and in a case where the timer means is outside the continuous operation request effective time, the transmission control means performs the transmission control processing by which the continuous operation request signal is transmitted repetitively over a period longer than an intermittent cycle and then the transmission data is transmitted once.

27. The communication device according to claim 20, wherein:
in a case where the transmission destination information specifies a simplex transmission, the transmission setting information specifies a state of having been enabled, and in a case where the timer means is outside the continuous operation request effective time, the transmission control means performs the transmission control processing by which the transmission data is transmitted repetitively over a period longer than an intermittent cycle.

28. The communication device according to claim 20, wherein:
in a case where the transmission destination information specifies a simplex transmission and the transmission setting information specifies a state of having been disabled, the transmission control means performs the transmission control processing by which the transmission data is transmitted once.

29. The communication device according to claim 20, further comprising:
reception setting holding means for holding reception setting information specifying whether data is received continuously or data is received intermittently by the reception means,
wherein in a case where the timer means is counting the continuous operation request effective time or the reception setting information specifies a continuous reception, the reception control means controls the reception means to receive the data continuously, and in a case where the timer means is not counting the continuous operation request effective time and the reception setting information specifies an intermittent reception, the reception control means controls the reception means to receive the data intermittently.

30. The communication device according to claim 20, wherein:
the network system is constructed from one controller and plural apparatuses other than the controller;
plural timer means are present in the communication device applied to the controller; and
in a case where the transmission destination information specifies a broadcast transmission, the transmission setting information specifies a state of having been enabled, and in a case where all the timer means are within the continuous operation request effective time, the transmission control means either performs the transmission control processing by which the continuous operation request signal is transmitted once and then the transmission data is transmitted once or performs the transmission control processing by which the continuous operation request signal is transmitted repetitively over a period longer than an intermittent cycle and then the transmission data is transmitted once.

31. The communication device according to claim 30, wherein:
in a case where the transmission destination information specifies a broadcast transmission, the transmission setting information specifies a state of having been enabled, and in a case where at least one timer means is outside the continuous operation request effective time, the transmission control means performs the transmission control processing by which the continuous operation request signal is transmitted repetitively over a period longer than the intermittent cycle and then the transmission data is transmitted once.

32. The communication device according to claim 30, wherein:
in a case where the transmission destination information specifies a broadcast transmission and the transmission setting information specifies a state of having been disabled, the transmission control means performs the transmission control processing by which the continuous operation request signal is transmitted once and then the transmission data is transmitted once.

33. The communication device according to claim 30, wherein:
in a case where the transmission destination information specifies a simplex transmission, the transmission setting information specifies a state of having been enabled, and in a case where the timer means correlated with a transmission destination is within the continuous operation request effective time, the transmission control means performs the transmission control processing by which the transmission data is transmitted once.

34. The communication device according to claim 30, wherein:
in a case where the transmission destination information specifies a simplex transmission, the transmission setting information specifies a state of having been enabled, and in a case where the timer means correlated with a transmission destination is within the continuous operation request effective time, the transmission control means performs the transmission control processing by which the continuous operation request signal is transmitted once and then the transmission data is transmitted once.

35. The communication device according to claim 30, wherein:
in a case where the transmission destination information specifies a simplex transmission, the transmission setting information specifies a state of having been enabled, and in a case where the timer means correlated with a transmission destination is outside the continuous operation request effective time, the transmission control means performs the transmission control processing by which the continuous operation request signal is transmitted by repeating a period longer than the intermittent cycle and then the transmission data is transmitted once.

36. The communication device according to claim 30, wherein:
in a case where the transmission destination information indicates the simplex transmission, the transmission setting information specifies a state of having been enabled, and in a case where the timer means correlated with a transmission destination is outside the continuous operation request effective time, the transmission control means performs the transmission control processing by which the transmission data is transmitted repetitively over a period longer than the intermittent cycle.

37. The communication device according to claim 30, wherein:
in a case where the transmission destination information specifies a simplex transmission and the transmission setting information specifies a state of having been disabled, the transmission control means performs the transmission control processing by which the transmission data is transmitted once.

38. The communication device according to claim 30, further comprising:
reception setting holding means for holding reception setting information specifying whether data is received continuously or data is received intermittently by the reception means,
wherein in a case where the timer means is counting the continuous operation request effective time or the reception setting information specifies a continuous reception, the reception control means controls the reception means to receive the data continuously, and in a case where the timer means is not counting the continuous operation request effective time and the reception setting information specifies an intermittent reception, the reception control means controls the reception means to receive the data intermittently.

39. A communication method for a network system including a communication device that receives data intermittently, characterized in that:
a communication device at a transmission end includes a transmission control step of transmitting data in which is set continuous operation request information causing timer means in a communication device that performs an intermittent reception to start counting a continuous operation request effective time, and starting its own timer means to count the continuous operation request effective time; and
the communication device that performs the intermittent reception and performs a continuous reception operation within the continuous operation request effective time includes a reception control step of starting its own timer means to count the continuous operation request effective time upon receipt of the data in which the continuous operation request information is set, wherein the transmission control step includes:
- a transmission setting reading step of reading out a state of a transmission setting that is enabled or disabled;
- a timer starting step of starting the timer means to count the continuous operation request effective time;
- an appending step of appending the continuous operation request information to transmission data;
- a broadcast transmission step for an intermittent reception of transmitting the transmission data by a broadcast transmission over a period longer than an intermittent cycle assuming that the transmission data is received at another communication terminal that performs an intermittent reception operation;
- a broadcast transmission step for a continuous reception of transmitting the transmission data by a broadcast transmission over a period shorter than the intermittent cycle assuming that the transmission data is received at another communication terminal that performs a continuous reception operation;
- a simplex transmission step for an intermittent reception of transmitting the transmission data by a simplex transmission over a period longer than the intermittent cycle assuming that the transmission data is received at another communication terminal that performs an intermittent reception operation; and
- a simplex transmission step for a continuous reception of transmitting the transmission data by a simplex transmission over a period shorter than the intermittent cycle assuming that the transmission data is received at another communication terminal that performs a continuous reception operation.

40. The communication method according to claim 39, wherein a communication device carrying out a broadcast transmission performs:
- the appending step and the broadcast transmission step for an intermittent reception followed by the timer starting step in a case where the transmission setting read out in the transmission setting reading step is enabled and the timer means is outside the continuous operation request effective time; and
- the appending step and the broadcast transmission step for a continuous reception followed by the timer starting step in any other case.

41. The communication method according to claim 39, wherein a communication device carrying out a simplex transmission performs:
- the appending step and the simplex transmission step for an intermittent reception followed by the timer starting step in a case where the transmission setting read out in the transmission setting reading step is enabled and the timer means is outside the continuous operation request effective time; and
- the simplex transmission step for a continuous reception in any other case.

42. The communication method according to claim 39, wherein a communication device carrying out a simplex transmission performs:
- the appending step and the simplex transmission step for a continuous reception followed by the timer starting step in a case where the transmission setting read out in the transmission setting reading step is enabled and the timer means is within the continuous operation request effective time;
- the appending step and the simplex transmission step for an intermittent reception followed by the timer starting step in a case where the transmission setting read out in the transmission setting reading step is enabled and the timer means is outside the continuous operation request effective time; and
- the simplex transmission step for a continuous reception in a case where the transmission setting read out in the transmission setting reading step is disabled.

43. The communication method according to claim 42, wherein:
- the network system is constructed from one controller that performs a continuous reception and plural apparatuses other than the controller;
- plural timer means are present in the communication device applied to the controller;
- the communication device applied to the controller and carrying out a broadcast transmission performs the signal generating step, and the broadcast transmission step for an intermittent reception followed by the timer starting step of starting all the plural timer means to count the continuous operation request effective time, in a case where the transmission setting read out in the transmission setting reading step is enabled and in a case where at least one timer means is outside the continuous operation request effective time, and performs the signal generating step, and the broadcast transmission step for a continuous reception followed by the timer starting step of starting all the plural timer means to count the continuous operation request effective time in any other case.

44. The communication method according to claim 43, wherein the communication device applied to the controller and carrying out a simplex transmission performs:
- the signal generating step and the simplex transmission step for an intermittent reception followed by the timer starting step of starting the timer means correlated with a transmission destination to count the continuous operation request effective time in a case where the transmission setting read out in the transmission setting reading step is enabled and the timer means correlated with the transmission destination is outside the continuous operation request effective time; and
- the simplex transmission step for a continuous reception in any other case.

45. The communication method according to claim 43, wherein the communication device applied to the controller and carrying out a simplex transmission performs:
- the signal generating step and the simplex transmission step for a continuous reception followed by the timer starting step in a case where the transmission setting read out in the transmission setting reading step is enabled and the timer means correlated with a transmission destination is within the continuous operation request effective time; and
- the simplex transmission step for a continuous reception in a case where the transmission setting read out in the transmission setting reading step is disabled.

46. The communication method according to claim 43, wherein the communication device applied to the controller and carrying out a simplex transmission performs:
- the simplex transmission step for a continuous reception in a case where the transmission setting read out in the transmission setting reading step is enabled and the timer means correlated with a transmission destination is within the continuous operation request effective time;
- the simplex transmission step for an intermittent reception in a case where the transmission setting read out in the transmission setting reading step is enabled and the timer means correlated with the transmission destination is outside the continuous operation request effective time; and the simplex transmission step for a continuous reception in a case where the transmission setting read out in the transmission setting reading step is disabled.

47. The communication method according to claim 39, wherein a communication device carrying out a simplex transmission performs:

the simplex transmission step for a continuous reception in a case where the transmission setting read out in the transmission setting reading step is enabled and the timer means is within the continuous operation request effective time;

the simplex transmission step for an intermittent reception in a case where the transmission setting read out in the transmission setting reading step is enabled and the timer means is outside the continuous operation request effective time; and the simplex transmission step for a continuous reception in a case where the transmission setting read out in the transmission setting reading step is disabled.

48. The communication method according to claim 39, wherein:

the network system is constructed from one controller that performs a continuous reception and plural apparatuses other than the controller;

plural timer means are present in the communication device applied to the controller; and the communication device applied to the controller and carrying out a broadcast transmission performs the appending step, and the broadcast transmission step for an intermittent reception followed by the timer starting step of starting all the plural timer means to count the continuous operation request effective time, in a case where the transmission setting read out in the transmission setting reading step is enabled and in a case where at least one timer means is outside the continuous operation request effective time, and performs the appending step, and the broadcast transmission step for a continuous reception followed by the timer starting step of starting all the plural timer means to count the continuous operation request effective time in any other case.

49. The communication method according to claim 48, wherein the communication device applied to the controller and carrying out a simplex transmission performs:

the appending step and the simplex transmission step for an intermittent reception followed by the timer starting step of starting the timer means correlated with a transmission destination to count the continuous operation request effective time in a case where the transmission setting read out in the transmission setting reading step is enabled and the timer means correlated with the transmission destination is outside the continuous operation request effective time; and the simplex transmission step for a continuous reception in any other case.

50. The communication method according to claim 48, wherein the communication device applied to the controller and carrying out a simplex transmission performs:

the appending step and the simplex transmission step for a continuous reception followed by the timer starting step in a case where the transmission setting read out in the transmission setting reading step is enabled and the timer means correlated with a transmission destination is within the continuous operation request effective time; and the simplex transmission step for a continuous reception in a case where the transmission setting read out in the transmission setting reading step is disabled.

51. The communication method according to claim 48, wherein the communication device applied to the controller and carrying out a simplex transmission performs:

the simplex transmission step for a continuous reception in a case where the transmission setting read out in the transmission setting reading step is enabled and the timer means correlated with a transmission destination is within the continuous operation request effective time;

the simplex transmission step for an intermittent reception in a case where the transmission setting read out in the transmission setting reading step is enabled and the timer means correlated with the transmission destination is outside the continuous operation request effective time; and the simplex transmission step for a continuous reception in a case where the transmission setting read out in the transmission setting reading step is disabled.

52. A communication method for a network system including a communication device that receives data intermittently, characterized in that:

a communication device at a transmission end includes a transmission control step of transmitting a continuous operation request signal causing timer means in a communication device that performs an intermittent reception to start counting a continuous operation request effective time, and starting its own timer means to count the continuous operation request effective time; and the communication device that performs the intermittent reception and performs a continuous reception operation within the continuous operation request effective time includes a reception control step of starting its own timer means to count the continuous operation request effective time upon receipt of the continuous operation request signal, wherein the transmission control step includes:

a transmission setting reading step of reading out a state of a transmission setting that is enabled or disabled;

a timer starting step of starting the timer means to count the continuous operation request effective time;

a signal generating step of generating the continuous operation request signal;

a broadcast transmission step for an intermittent reception of transmitting the continuous operation request signal by a broadcast transmission over a period longer than an intermittent cycle assuming that the continuous operation request signal is received at a communication device that performs an intermittent reception operation;

a broadcast transmission step for a continuous reception of transmitting the continuous operation request signal by a broadcast transmission over a period shorter than the intermittent cycle assuming that the continuous operation request signal is received at another communication device that performs a continuous reception operation;

a simplex transmission step for an intermittent reception of transmitting the continuous operation request signal by a simplex transmission over a period longer than the intermittent cycle assuming that the continuous operation request signal is received at another communication device that performs an intermittent reception operation; and a simplex transmission step for a continuous reception of transmitting the continuous operation request signal by a simplex transmission over a period shorter than the intermittent cycle assuming that the continuous operation request signal is received at another communication device that performs a continuous reception operation.

53. The communication method according to claim 52, wherein a communication device carrying out a broadcast transmission performs:

the signal generating step and the broadcast transmission step for an intermittent reception followed by the timer starting step in a case where the transmission setting read out in the transmission setting reading step is enabled and the timer means is outside the continuous operation request effective time; and the signal generating step and the broadcast transmission step for a continuous reception followed by the timer starting step in any other case.

54. The communication method according to claim 52, wherein a communication device carrying out a simplex transmission performs:

the signal generating step and the simplex transmission step for an intermittent reception followed by the timer starting step in a case where the transmission setting read out in the transmission setting reading step is enabled and the timer means is outside the continuous operation request effective time; and the simplex transmission step for a continuous reception in any other case.

55. The communication method according to claim 52, wherein a communication device carrying out a simplex transmission performs:

the signal generating step and the simplex transmission step for a continuous reception followed by the timer starting step in a case where the transmission setting read out in the transmission setting reading step is enabled and the timer means is within the continuous operation request effective time;

the signal generating step and the simplex transmission step for an intermittent reception followed by the timer starting step in a case where the transmission setting read out in the transmission setting reading step is enabled and the timer means is outside the continuous operation request effective time; and the simplex transmission step for a continuous reception in a case where the transmission setting read out in the transmission setting reading step is disabled.

56. The communication method according to claim 52, wherein a communication device carrying out a simplex transmission performs:

the simplex transmission step for an intermittent reception in a case where the transmission setting read out in the transmission setting reading step is enabled and the timer means is within the continuous operation request effective time;

the simplex transmission step for an intermittent reception in a case where the transmission setting read out in the transmission setting reading step is enabled and the timer means is outside the continuous operation request effective time; and the simplex transmission step for a continuous reception in a case where the transmission setting read out in the transmission setting reading step is disabled.

* * * * *

UNITED STATES PATENT AND TRADEMARK OFFICE
CERTIFICATE OF CORRECTION

PATENT NO. : 7,599,318 B2  Page 1 of 1
APPLICATION NO. : 10/576294
DATED : October 6, 2009
INVENTOR(S) : Daisuke Kobayashi et al.

It is certified that error appears in the above-identified patent and that said Letters Patent is hereby corrected as shown below:

In the Claims

In column 39, claim 22, line 62, "thank an intermittent cycle and then" should read -- than an intermittent cycle and then --.

Signed and Sealed this

Second Day of February, 2010

David J. Kappos
*Director of the United States Patent and Trademark Office*